United States Patent [19]

Acker

[11] Patent Number: 4,527,186
[45] Date of Patent: Jul. 2, 1985

[54] MULTICOLOR LIGHT PATTERN IMAGE FORMING SYSTEM

[76] Inventor: Louis S. Acker, P.O. Box 81, Chichester, N.Y. 12416

[21] Appl. No.: 405,940

[22] Filed: Aug. 6, 1982

[51] Int. Cl.$^3$ .............................................. H04N 9/02
[52] U.S. Cl. ........................................... 358/1; 353/1
[58] Field of Search .................... 353/1; 350/4; 358/1

[56] References Cited

U.S. PATENT DOCUMENTS

| | | | |
|---|---|---|---|
| 3,160,975 | 12/1964 | Malina | 353/1 |
| 4,010,361 | 3/1977 | Latterman et al. | 353/1 |
| 4,247,181 | 1/1981 | Inness-Brown | 353/1 |

FOREIGN PATENT DOCUMENTS 1233102  1/1967  Fed. Rep. of Germany .......... 353/1

Primary Examiner—Richard Murray
Attorney, Agent, or Firm—Daniel H. Kane, Jr.

[57] ABSTRACT

A light pattern image forming system has an intermittent light source for generating pulses of light over an optical path. The system includes a variety of elements constructed and arranged for independent degrees of freedom of motion and for relative motion off axis with respect to each other. In a preferred embodiment a color wheel comprising sectors of different color light transmitting material, is mounted for rotation about a first center of rotation. The first center of rotation is offset from the intermittent light source so that sectors of different color light transmitting material pass adjacent to the light source for generating multicolor pulses of light over the optical path. A mask is also mounted for rotation about a second center of rotation offset from the first center of rotation and spaced from the color wheel. The second center of rotation of the mask falls along the optical path defined by the intermittent light source, sectors of multicolor light transmitting material and center of rotation of the mask. Variable speed motors drive the color wheel and masks. An image presentation device such as a photographic, movie or video camera or a screen is aligned along the optical path following the mask for recording and/or displaying the multicolor light pattern images formed by the system.

49 Claims, 31 Drawing Figures

FIG ID

MULTICOLOR LIGHT PATTERN IMAGE FORMING SYSTEM

TECHNICAL FIELD

The present invention relates to a new and improved system for generating black and white and color light pattern images with symmetries and geometries of endless variation. Such light pattern images are presented or recorded in stationary form, for example, on slide and color film; in live and varying form on screens, television, and video tape; and in synchronization with music. The system is useful in generating art work, media materials, and materials for esthetic enjoyment and attention directing purposes.

BACKGROUND ART

A variety of devices have been developed for providing luminous displays of pleasing patterns of light with stroboscopic effects, etc. U.S. Pat. No. 3,245,163 describes a luminous display device having a fluorescent light source electrically coupled to provide stroboscopic effects so that the fluorescent light is a pulsating source. The device includes in sequence along a common axis a rotating color disk having angular openings covered by transparents sheets of different colors, a rotating mask or opaque masking disk with different shaped openings distributed through it, and a window for viewing the patterns of light produced. While a clutch mechanism is provided and permits relative difference in angular velocity between the disk elements, a limitation and constraint to rotational motion about the same axis precludes other degress of freedom of motion and motion of the elements relative to each other off axis. This limitation and constraint therefore precludes other possibilities and variations in color, symmetries and geometries of the light pattern images. Furthermore, this patent discloses only a particular light source of limited variability and application.

U.S. Pat. No. 3,793,755 describes an illuminated display apparatus having a light source in the form of an incandescent lamp followed by a rotating color wheel, in turn followed by a rotating three dimensional diffracting element for disbursing the multicolor light. The use of such an irregular three dimensional diffracting element precludes the generation of controlled symmetries and geometries in the light pattern image. Nor does this invention permit controlled variation in the degrees of freedom of motion of the elements of the device relative to each other.

U.S. Pat. Nos. 4,171,882 and 3,242,330 describe additional apparatus for light projection systems and decorative lighting effects but without the capability of generating an endless variety of controlled symmetries and geometries in multicolor light pattern images.

OBJECTS OF THE INVENTION

It is therefore an object of the present invention to provide a light pattern image forming system capable of generating an endless variety of patterns of light exhibiting marked and striking symmetries and geometries under the control of the system operator.

Another object of the invention is to provide a light pattern image forming system with moving elements capable of independent degrees of freedom of motion under the control of the system operator for achieving variations in the light pattern image symmetries and geometries.

A further object of the invention is to provide a light pattern image forming system for generating light pattern images in a multicolor format and with the color format and variation independently controllable from the image pattern symmetry or geometry.

The invention is also intended to provide image presentation, display, or recording, both in stationary and live moving media formats such as color slides or video recordings, and for use in toys and entertainment devices.

DISCLOSURE OF THE INVENTION

In order to accomplish these results, the present invention provides a light pattern image forming system having an intermittent light source for generating pulses of light over an optical path. The system includes a variety of elements constructed and arranged for independent degrees of freedom of motion and for relative motion off axis with respect to each other. In a preferred embodiment a color wheel comprising sectors of different color light transmitting material, is mounted for rotation about a first center of rotation. The first center of rotation is offset from the intermittent light source so that sectors of different color light transmitting material pass adjacent to the light source for generating multicolor pulses of light over the optical path. A variable speed motor may be used for rotating the color wheel.

According to the invention a mask is also mounted for rotation about a second center of rotation offset from the first center of rotation and spaced from the color wheel. The second center of rotation of the mask falls along the optical path which is defined by the intermittent light source, sectors of multicolor light transmitting material passing adjacent to the intermittent light source, and second center of rotation of the mask. The first center of rotation of the color wheel is thus off axis from the optical path. A variable speed motor may also be provided for controlling rotation of the mask.

Finally, an image presentation device such as a photographic, movie, or video camera or a screen is aligned along the optical path following the mask for recording and/or displaying the multicolor light pattern images formed by the system.

The mask patterns contemplated by the present invention generally comprise patterns or arrays of slits arranged with an identifiable symmetry or geometry relative to the second center of rotation of the mask. Thus, for example, the mask pattern may be an array of radial slots centered on the second center of rotation or a spiral slit or set of spiral slits having an origin at the second center of rotation.

The invention contemplates a variety of arrangements for providing an intermittent light source for generating pulses of light. According to one aspect of the invention, the intermittent light source comprises at least one strobe light flash tube generating stroboscopic pulses of light. The timing of the pulses affords yet another effective degree of freedom of motion for introducing variation into the final light pattern images formed by the system.

The end results on the screen or camera are images for stationary and motional displays in multicolor format somewhat analogous to the lissajous figures which may be generated on video monitors but including even greater variation of image elements and with standing patterns, progressing patterns and regressing patterns.

The structural content and movement of images generated by the system may be correlated with music by analog or digital synchronization. Thus, music may be used to control the timing of flashes from the strobe flash tube. Alternatively, simple digital circuitry may be used to scale down or vary the frequency of musical notes in accordance with strobe flash rates. This provides another mode for linking the visual pattern directly to musical variations.

According to another aspect of the invention, the light pattern image forming system may be embodied in a toy or entertainment and amusement device. According to this aspect of the invention, either or both the color wheel and rotating mask are constructed in the form of an air turbine with turbine blades arranged around the periphery of the color wheel and mask. Air passageways are provided for delivering air under pressure to the turbine blades for rotating the color wheel and mask either independently or together. Thus, first and second air hoses are added to the device for blowing separately on the turbine blades of the color wheel and rotating mask or the air passageway hoses may be joined together for rotating the air turbines comprising the color wheel and mask simultaneously.

The mask may be mounted on a transparent mounting wheel which may be formed with a fresnel condenser lens across one surface and, for example, a frosted window front surface for viewing the light pattern images directly. The mask is mounted for rotation by ballbearing races at the circumference of the mask so that there is no axle at the second center of rotation to interfere in the light pattern images generated by the system. When the air turbine embodiment of the invention is not being used, the mask may be driven for rotating the mask by a belt drive constructed and arranged around the outer circumference of the mask.

A feature and advantage of the off axis motion of the elements of the system is that selected color sectors may be fully presented before the intermittent light source providing pulses of light of separate and different colors during successive and sequential pulses when different sectors of the color wheel occupy the optical path adjacent to the intermittent light source.

According to another embodiment of the invention, the intermittent light source is afforded by the combination of a continuous light source such as a lamp providing continuous illumination, and an optical siren disk mounted for rotation about a center of rotation offset from the lamp or other light source. The optical siren disk comprises an opaque disk with a plurality of openings formed through the disk in a ring concentrically around the first center of rotation. The openings are aligned with the lamp or other continuous light source during rotation of the siren disk thereby generating and passing intermittent pulses of light along the optical path. The openings through the siren disk may be covered with light transmitting materials of different colors for generating multicolor pulses of light along the optical path.

In an alternative arrangement the light source comprises instead of a continuous illuminating lamp, a fresnel lens spaced from the siren disk and positioned and arranged for focusing ambient light through the openings of the concentric ring of openings formed through the siren disk as it rotates. The mask may also be formed with a collimating fresnel lens formed across the surface of the mask disk.

The "optical siren disk" intermittent light source embodiment of the invention may also be constructed in the form of a toy or amusement device with the optical siren disk in the form of an air turbine with air turbine blades formed around the periphery. An air passageway or air hose is similarly arranged for delivering air under pressure to the turbine blades for driving the turbine and thereby rotating the optical siren disk.

The invention also contemplates alternative configurations for various elements of the light pattern image forming system. For example, instead of an optical siren disk, an optical siren belt may be mounted for translation and passage of the belt adjacent to the continuous light source. Such a siren belt is formed by an opaque belt portion having a row of transparent or transmitting openings aligned with the light source during translation of the siren belt around a pair of belt drums. The light source is, of course, arranged inside the belt between the sides of the translating belt. As with the optical siren disk, light transmitting materials of different colors may cover the openings for generating multicolor light pulses along an optical path. An optical siren cylinder or drum configuration may also be used.

Instead of a color wheel, a color drum may be used mounted for rotation about a strobe light flash tube, for example, postioned at the center of rotation of the drum. The color drum is formed with successive bands of different color light transmitting material formed around a drum or cylinder. A belt configuration may also be used for the color bands.

The invention also contemplates a stationary light source for delivering multicolor pulses of light along an optical path without the necessity of a rotating color wheel or color drum. According to this aspect of the invention, a plurality of strobe light flash tubes are arranged in an array with each flash tube mounted in a cylindrical envelope tube. The envelope tube is formed with reflective surface along one side and on the other-side a light transmitting color filter so that the plurality of cylindrical envelope tubes in the array will generate multicolor pulses of light in the direction of the path according to the strobe light flash tubes selected for activation. For example, the strobe light tubes housed in cylindrical envelope tubes may be arranged in a radial array with at least two flash tubes and cylindrical envelope tubes per selected color. By using two or more flash tubes per color more even lighting by different color pulses of light along the optical path is achieved.

The strobe light flash tubes and cylindrical envelope tubes may also be arranged in first and second radial arrays, the second radial array offset behind the first array for visibility of all the flash tubes of the composite array in the direction of the optical path. In yet another embodiment, the strobe light flash tubes and cylindrical envelope tubes are arranged in a parallel array. In each example the strobe light flash tubes are mounted in the corresponding cylindrical envelope tube spaced from the cylindrical envelope tube by wire screen spacers to permit the passage of cooling air. The radial array of the light source permits accommodation of a central air plenum for delivering cooling air to each of the envelope tubes in the array.

In this multicolor light source composed of an array of strobe light flash tubes both the color of the lighting and the timing may be controlled and synchronized with music or other audio input. This is accomplished using an analog or digital music/audio to flash rate and flash tube position control circuit. Such a circuit controls the multiple power supplies for the strobe light flash tube in response to music or audio input as hereafter described.

In another embodiment of the light pattern image forming system, the elements of the system are arranged in concentric cylinders or drums coaxial relative to each other from a central axis radially outwardly. According to this embodiment the intermittent light source comprises an elongate strobe light flash tube forming the central axis of the light pattern image forming system. Pulses of light are therefore directed radially outwardly. A cylindrical envelope tube of light transmitting material is formed coaxially around the central flash tube and may include multicolor light transmitting bands for generating multicolor pulses of light. The color cylinder or drum may be stationary or mounted for rotation to add another degree of freedom. The light transmitting mask is formed on a mounting drum suspended coaxially around the central flash tube and envelope tube. The support for suspending the mask mounting drum over and coaxially around the envelope tube includes a variable speed motor whereby the mask and mask mounting drum may be rotated by the variable speed motor around the envelope tube and central intermittent light source. The mask wrapped around the mounting drum comprises an opaque material with a transmitting pattern portion arranged along the mask so that different light pattern images are projected along radial directions from the central strobe light flash tube during rotation of the mask mounting drum.

In yet another configuration of the light pattern image forming system, the invention contemplates and provides a pendulum and means for swinging the pendulum through a small arc. A housing enclosure is coupled to the end of the pendulum and contains the intermittent light source, and mask elements of the invention as heretofore described positioned within the housing enclosure to define and optical path for projecting light pattern images through the bottom of the housing. A stationary reflector below the swinging pendulum housing diverts the optical path to an image presentation component such as a camera or screen for recording or displaying the light pattern images formed by the moving translating and swinging elements within the pendulum housing. Thus, in its various embodiments the invention contemplates both rotational motion and translational motion of the light pattern image forming elements mounted within the system and degress of freedom of motion which include off axis motion of the elements relative to each other, either by rotation or translation. Alternatively, the camera is mounted on the pendulum directed at the image forming system in stationary position below.

An even further variation of the invention contemplates introducing a dove prism mounted in the optical path for rotation about an axis of rotation along the optical path thereby affording a rotating image effect even when the mask is maintained in stationary position. Thus, rotation of the light pattern image formed by the mask is achieved by an optical effect of prism rotation rather than mask rotation. Such an optical element introduces yet another degree of control and variation of movement for exploring the symmetries and geometries which may be generated in the output images. Alternatively, the entire image forming system housing may be mounted for rotation relative to the camera, or the camera may be mounted for rotation to achieve the image rotation effect.

Other objects, features and advantages of the invention will become apparent in the following specification and accompanying drawings.

BRIEF DESCRIPTION OF THE DRAWINGS

FIGS. 1B, 1C and 1D are detail plan views of three examples of black and white pattern masks used in forming different image pattern symmetries in the image forming system.

FIG. 2 is a diagrammatic side view in partial section of a light pattern image forming system incorporating an "optical siren" in accordance with the present invention, while

PREFERRED EXAMPLE EMBODIMENTS AND BEST MODE OF THE INVENTION

Figure 1:
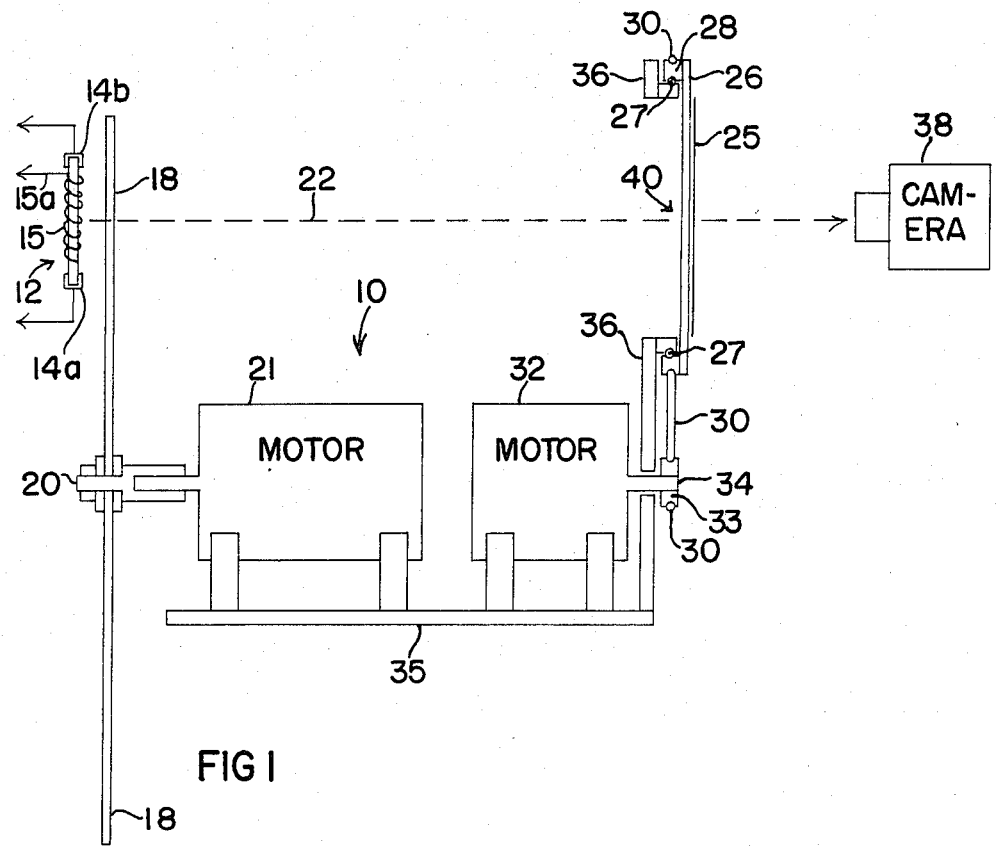
FIG. 1 is a diagrammatic side view in partial section showing a multicolor light pattern image forming system according to the present invention.
Figure 1A:
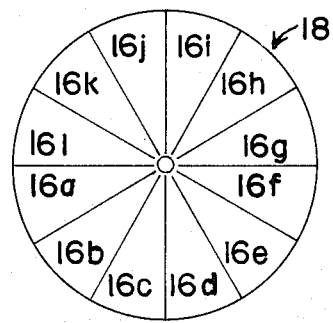
FIG. 1A is a detail plan view of the color wheel used in forming the multicolor light pulses.

A multicolor light pattern image forming system 10 according to the present invention is illustrated in FIG. 1. The system includes an intermittent light source in the form of a strobe light flash tube 12 such as a xenon strobe flash tube with eletrodes 14A and 14B having leads coupled to a strobe circuit not shown and a trigger coil 15 with lead 15A. Pulses of light generated by the intermittent light source 12 pass through one of the sectors 16 of color wheel 18 shown in further detail 1A. In this example the color wheel 18 is divided into 12 sectors 16a through 16l. Each of the sectors comprises a different color light transmitting or transparent material for imparting color to the light pulses passing through the color disk. For example, sectors 16a, 16c, 16e, 16g, 16i, and 16k represent the six colors: red, orange, yellow, green, blue and purple. The intermediate sectors 16b, 16d, 16f, 16h, 16j, and 16l represent intermediate combinations of the six basic colors, for example; red-orange, yellow-orange, yellow-green, turquoise, indigo, and purple-red.

The color wheel 18 is mounted for rotation on an axis or arbor 20 driven by variable speed DC motor 21 which may be, for example, a variable voltage control motor. The axis of rotation 20 of color wheel 18 is offset from the intermittent light source 12 so that the light pulses pass through the outer portions of the sectors 16 of color wheel 18. By this expedient, multicolor pulses are generated along the optical path 22 defined by the intermittent light source 12 color wheel sectors 16 and center of rotation of rotating mask 25 hereafter described. Thus, the orientation of the intermittent light source 12, color wheel 18 and axis of rotation 20 is that pulses of substantially uniform color are generated by pulses of light passing through the outer portion of the sector 16 of color wheel 18.

The light pattern image forming system 10 also includes a rotating mask 25 mounted on a rotating turntable mounting plate or window 26 in turn mounted on ball bearing race 27 on the inner side of the perimeter or peripheral wall 28 of the rotating transparent turntable or window 26. The mask 25 is mounted on the face of turntable or window 26 and the turntable 26 is driven to rotation on the ball bearing race 27 by means of the drive belt 30 which passes in a groove around the outer perimeter or peripheral wall 28 of the turntable 26. The drive belt 30 is driven by a second variable speed DC motor 32 by the pulley 33 mounted on the motor arbor or drive axis 34.

The second variable speed DC motor 32 along with the color wheel motor 21 are both mounted and fixed to a mounting plate 35 which forms a stationary base or chasse for the light pattern image forming system 10. The side wall support 36 is also an integral part of the mounting plate 35 and provides support for the rotating mask turntable or window 36.

A feature and advantage of the rotating mask mounting system of the present invention is that the center of rotation 40 of mask 25 is free of any central axis or other obstruction to multicolor light pulses along the optical path 22. In fact, optical path 22 substantially coincides with the second center of rotation 40 of the mask 25 and turntable 26. Thus, the second center of rotation 40 of the mask is offset substantially from the first center or axis of rotation 20 of the color wheel 18. The multicolor light pulses originating with the intermitfent light source 12 and color sector 16 of color wheel 18 thereby pass with integrity through the transparent window or turntable 26, which may be constructed, for example, of plexiglass (TM). The multicolor light pulses therefore form multicolor light patterns passing through the pattern of openings or transmitting portions of mask 25 the varying patterns achieved by the rotation of mask 25 are recorded on camera 38 which may be a photographic, movie, or video camera. The film or other media of the camera sums the intermittent and changing patterns of light of different color passing through the mask 25 at different angles of rotation forming striking light pattern images somewhat analogous to lissajous figures. According to the coordination of the timing of the pulses from intermittent strobe light flash tube 12, the angular velocity of color wheel 18, the angular velocity of mask 25 and the speed or other characteristics of the camera 38 and the recording medium, multicolor standing patterns of striking symmetries can be achieved or moving patterns undergoing forward and backward rotation can be achieved.

Figure 1B:
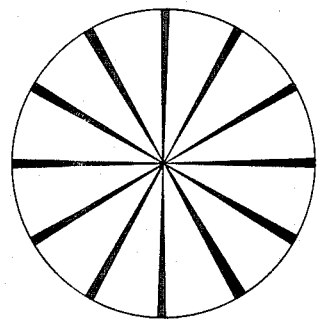
Figure 1C:
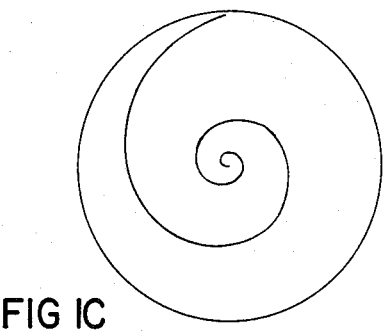

Examples of the types of mask patterns which may be used for mask 25 are illustrated in FIGS. 1B, 1C, and 1D. In these illustrations, of course, the mask pattern is shown in negative or reverse with the black slits representing the openings in an otherwise black or opaque mask surface. Slits of radially symmetrical configuration as shown in FIG. 1B and spiral slit or spiral opening patterns as shown in FIGS. 1C and 1D offer only a few examples of the types of mask patterns that may be used. It has been found according to the present invention that mask patterns arranged with a symmetry with reference to the second center of rotation 40 generate the most interesting and striking multicolor light pattern images. In FIG. 1B, a pattern of actual radial symmetry is used, while in FIGS. 1C and 1D logarithmic spirals are used growing in logarithmic spiral fashion from an origin coinciding with the second center of rotation 40.

Figure 2:
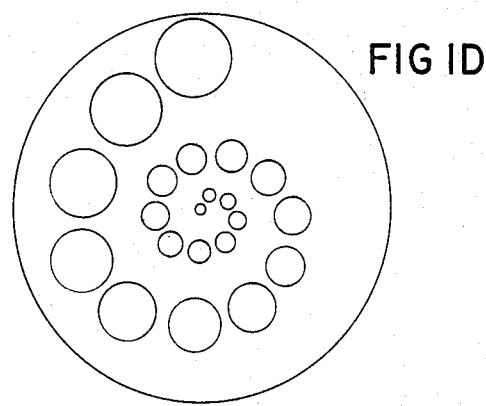
Figure 2:
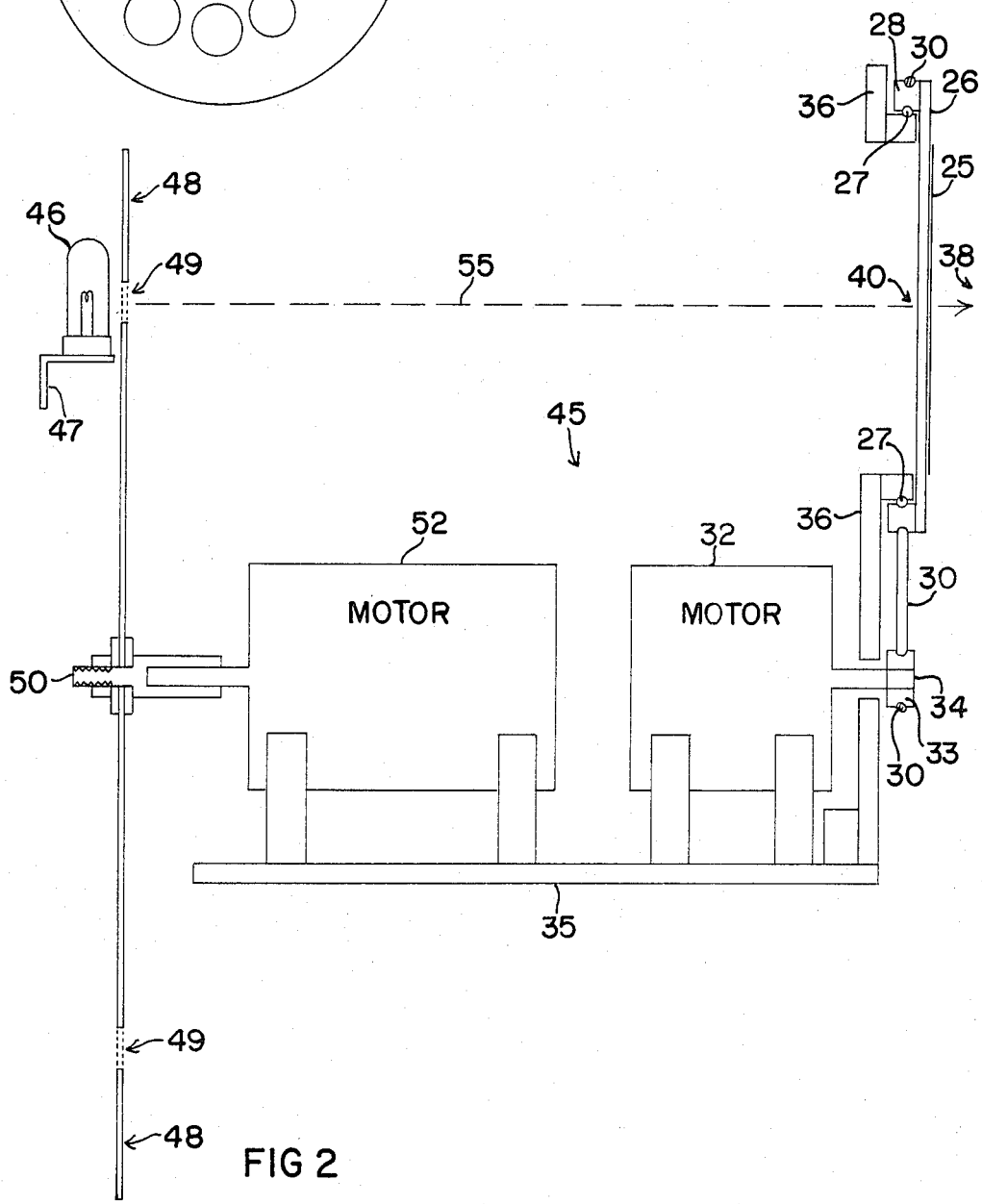
Figure 2A:
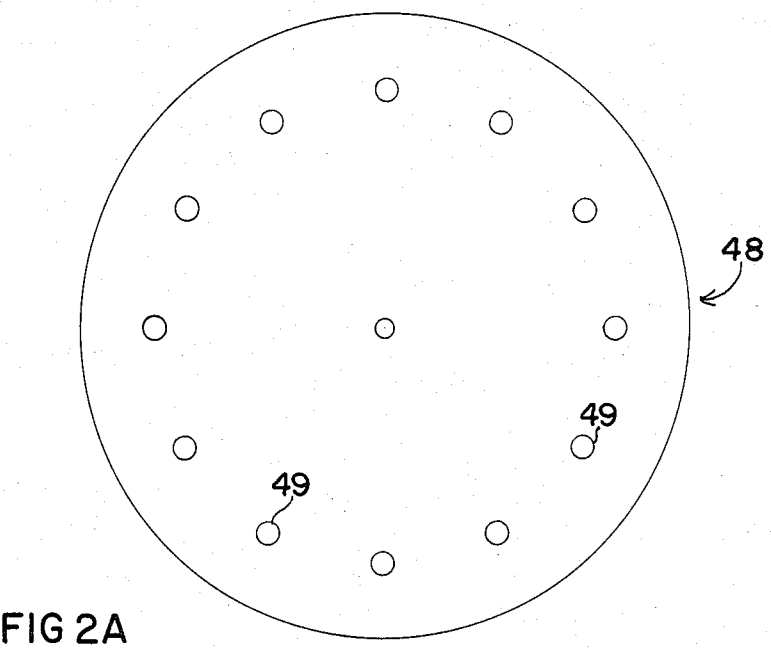
FIG. 2A is a detail plan view of the optical siren disk.

In the example of the light pattern image forming system 45 illustrated in FIG. 2 a novel and alternative intermittent light source referred to herein as an "optical siren" is incorporated into the system. Instead of a strobe light flash tube source as used in the embodiment described with reference to FIG. 1, in the example of FIG. 2 a continuous illuminating lamp mounted on a bracket 47 is used. Instead of the color wheel 18 an optical siren disk 48 is mounted on the first axis of rotation 50 being the motor arbor or axis of variable speed motor 52 which may be, for example, a series wound fast DC motor. The optical siren disk 48 also shown in FIG. 2A comprises an opaque disk portion and a ring of holes or openings 49 formed concentrically around the center of rotation of the optical siren disk 48. The holes 49 or openings 49 are aligned with the continuous illuminating lamp 46 so that upon rotation of the siren disk 48 at high speed, pulses of light pass along the optical path 55. The holes 49 formed in a ring around the outer portion of the siren disk 48 may be covered with different color light transmitting or transparent material for generating multicolor light pulses along the optical path 55.

The remaining portions of the optical siren disk embodiment of the invention illustrated in FIG. 2 are the same as described with reference to FIG. 1 and the same reference numerals are applied. Thus, the rotating mask 25 is mounted on the rotating turntable or window 26 mounted for rotation on bearings at 27 at its periphery and driven by drive belt 30 around the outer circumference of the rotating turntable or window 26. The second center of rotation 40 of the mask is unimpeded by an axle and the center of rotation 40 is of course offset substantially from the first center of rotation 50 of the optical siren disk 48.

Figure 3:
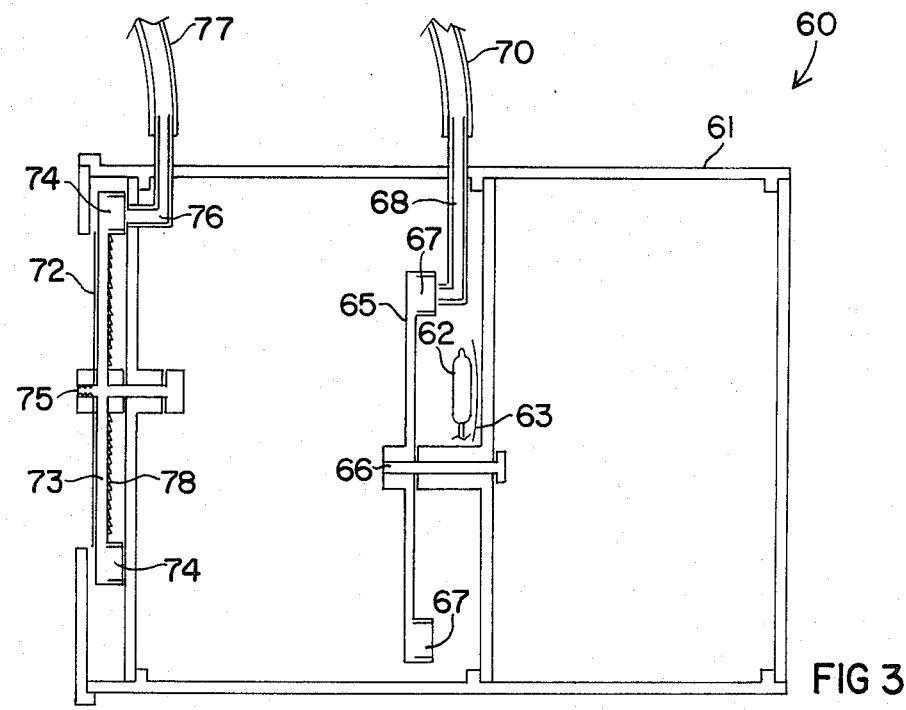
FIG. 3 is a diagrammatic side view in partial section of a light pattern image forming toy according to the present invention in which the color wheel and pattern mask are mounted on air driven turbines for rotation.
Figure 3A:
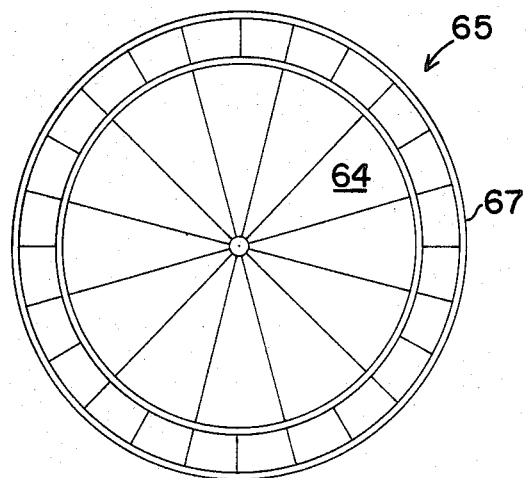
FIG. 3A is a detail plan view of the turbine wheel.

An embodiment of the present invention in the form of a toy or amusement device 60 is illustrated in FIG. 3. A plastic housing or case 61 is provided for the elements of the light pattern image forming system including an intermittent light source in the form of strobe light flash tube 62 mounted adjacent a reflector mirror 63. Pulses of light from the flash tube 62 pass through sectors 64 of different color light transmitting material arranged around the color wheel 65 mounted for rotation about the first center of rotation and axis 66. The color wheel 65 also illustrated in FIG. 3A is constructed in the form of an air turbine with turbine blades 67 distributed around the periphery of the color wheel. The motive force for driving and rotating the air turbine color wheel 65 is a stream of air delivered through air passageway 68 in turn coupled to a flexible tube 70 through which the player or operator may blow to operate the air turbine color wheel at a desired angular velocity.

Spaced from the intermittent light source and color wheel at the front of the toy 60 is the rotating mask 72 mounted on a rotating turntable or window 73 in turn constructed as an air turbine with turbine blades 74 arranged from the periphery. The rotating mask and supporting turntable or window 73 mounted for rotation about a second center of rotation and axis 75. The motive force for rotating the mask and turntable is air under pressure delivered through air passageway 76 in turn coupled with flexible hose 77 in which the player or operator may blow to rotate the mask and supporting wheel at a desired angular velocity. Along the rear face of the transparent mounting wheel or turntable 73 is formed a fresnel collimating lens or condenser lens 78 which may be, for example, integrally molded to the surface of the mask mounting wheel or turntable.

By this construction and arrangement a simple motive force is provided for rotation of the color wheel 65 on the one hand and the rotating mask 72 and mounting wheel 73 on the other hand, independently and at different angular velocities. A feature and advantage of the transparent supporting wheel 73 and integrally formed fresnel condenser lens surface 78 is that the mask pattern mounting wheel functions as a direct observation screen for viewing light pattern images generated by the toy or amusement device.

Figure 4:
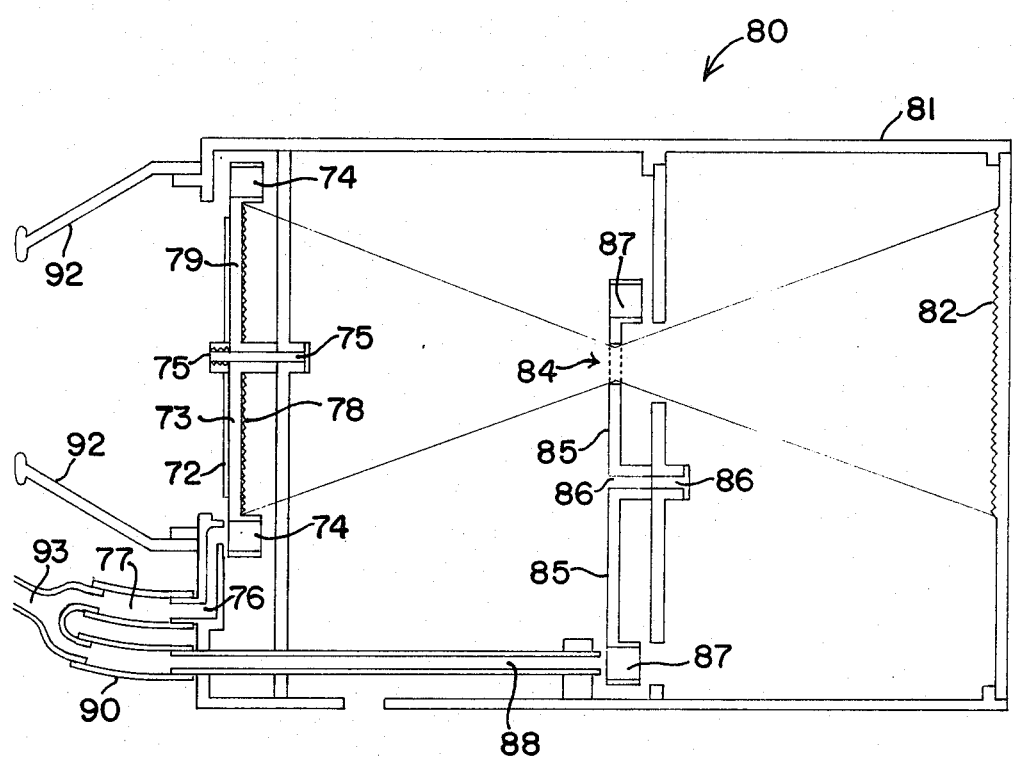
FIG. 4 is a diagrammatic side view in partial section of another light pattern image forming toy incorporating an "optical siren" according to the present invention also driven by an air turbine.

An alternative configuration for such a toy using the optical siren disk or wheel in accordance with the present invention is illustrated in FIG. 4. According to this optical siren wheel embodiment of the invention, the toy 80 is formed with a housing or plastic case 81 and uses for a continuous light source the ambient light focused by a fresnel lens 82 formed along the rear side or surface of the housing case 81. Fresnel lens 82 focuses a large area of ambient light at the ring of holes 84 formed concentrically around the axis and center of rotation 86 of optical siren disk or wheel 85 of the type described with reference to FIG. 2. In this example, however, the optical siren disk or wheel 85 is constructed in the form of an air turbine with air turbine blades 87 formed around the periphery of the wheel 85. The motive force for rotation of the optical siren wheel 85 is air under pressure delivered along air channel 88 from a flexible hose 90.

The rotating mask and mask turntable or wheel portion of the toy 80 is the same as that described with reference to the toy of FIG. 3 and the same reference numerals are used to refer to identical elements. In this example it is emphasized that the front surface of the mask mounting wheel or turntable 73 is formed with a frosted surface to provide a window for directly viewing the light pattern images generated by the toy or amusement device. To facilitate viewing, a rubber viewing port or eyepiece 92 is provided. Furthermore, the air hoses 77 and 90 for blowing, delivering air, and driving the rotating mask and turntable 73 and rotating optical siren wheel 85 are joined or coupled into a single mouthpiece 93 for simultaneously driving both the air turbine wheels by blowing on the single mouthpiece 93.

Figure 5:
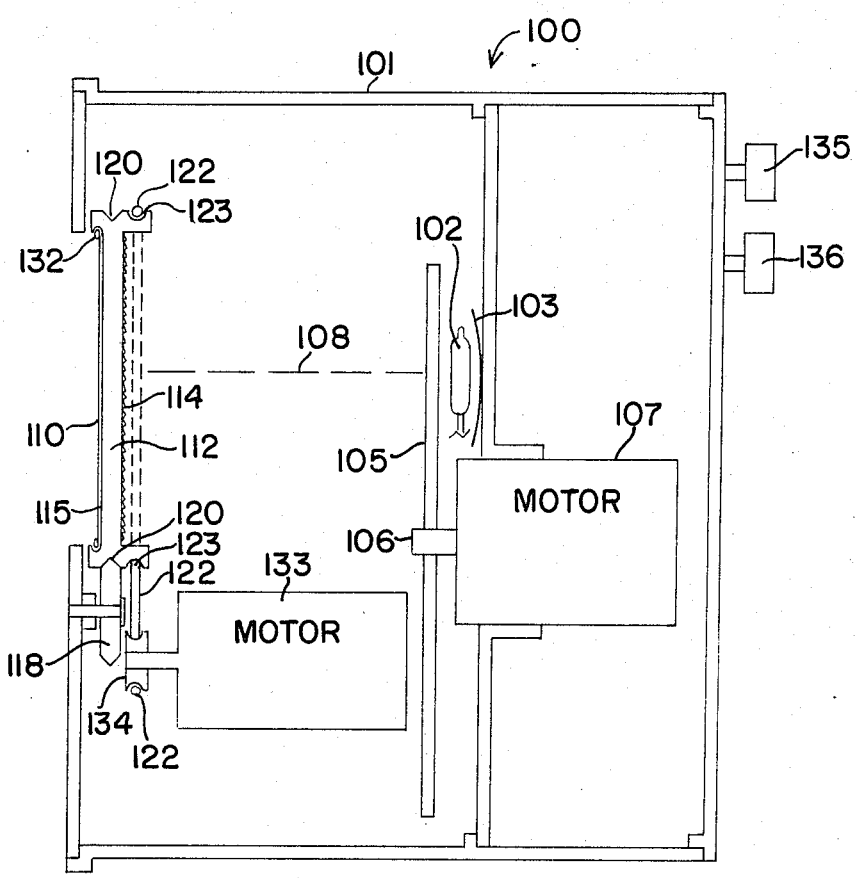
FIG. 5 is a diagrammatic side view in partial cross section showing another light pattern image forming toy in which the rotating color wheel and pattern mask are driven by electric motors.
Figure 5A:
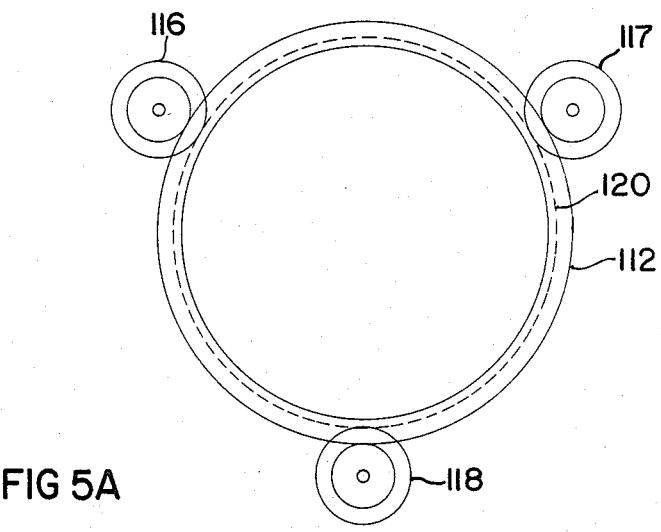
FIG. 5A is a detail plan view of the rotational mounting for the viewing window of the toy shown in FIG. 5.
Figure 5B:
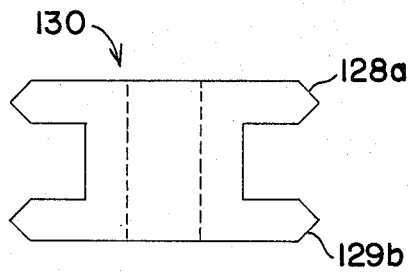
FIGS. 5B and 5C are respectively a side view and plan view respectively of the nylon mounting rollers for the viewing window.

FIG. 5 illustrates yet another toy or amusement device embodiment of the present invention generally designated 100. In this toy embodiment of the invention the housing 101 contains an intermittent light source in the form of flash tube 102 mounted adjacent reflector mirror 103. Color wheel 105 composed of sectors of different color light transmitting material arranged around the color wheel is mounted for rotation about a first center of rotation or axis 106 and is driven by variable speed DC motor 107. The multicolor light pulses so generated pass along the optical path 108 through rotating mask 110 mounted on the rotating mounting wheel or turntable 112 formed along its inside surface with a fresnel condenser lens 114 integrally molded into the plastic wheel or turntable 112. The outer surface of the molded plastic window or turntable 112 may be frosted to provide a viewing surface. Referring also to FIGS. 5A through 5B the rotating mask mounting window or turntable 112 is mounted for rotational bearing around its outer periphery by a plurality of at least 3 rollers, 116, 117, and 118 which engage in a complementary manner the groove 120 formed around the periphery of the wheel 112. In the example of FIG. 5 the mask mounting wheel 112 is driven in rotation by a drive belt 122 fitted into a second groove 123 also formed around the periphery of the mounting wheel 112.

Figure 5C:
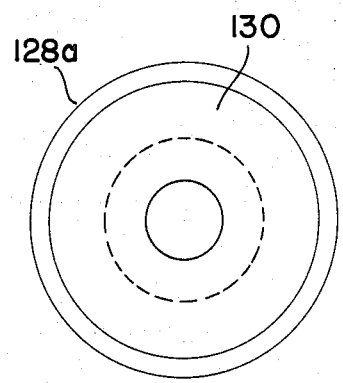
Figure 5D:
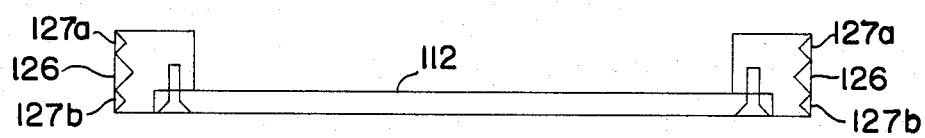
FIG. 5D is a side cross section of the viewing window.

An alternative roller and mounting configuration for the mask mounting wheel or turntable is illustrated in FIGS. 5B, 5C, and 5D. In this arrangement the mask mounting window or turntable 112 is formed at its outer periphery with a central drive belt groove 126 and outer roller groove 127A and 127B complementary to the double rolling edges 128A and 128B of double rollers 130 as shown in FIGS. 5B and 5C. In either arrangement the outer rotational roller bearing arrangement leaves the center of the rotating mask and mask mounting assembly free of any obstructions or interference such as axles or pivots and for delivering unimpeded variable light pattern images for viewing at the frosted surface 115 of the rotating viewing window 112. As heretofore described the viewing window also functions as the mask mounting window, the mask 110 being retained against the viewing surface by a snap on retainer ring 132. The motive source for rotation of the mask mounting and viewing window 112 is the drive belt 122 arranged around the outer circumference in groove 123 and in turn driven by the variable speed DC motor 133 by a pulley 134. Speed control knobs 135 and 136 are also provided for electrical control respectively of the variable speed DC motors 107 and 133 which in turn control the angular velocities of the color wheel 105 and mask mounting wheel 112.

Figure 6A:
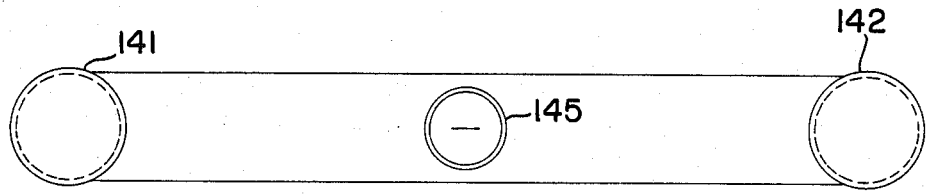
FIG. 6 is a diagrammatic side view and FIG. 6A a plan view from above of an alternative optical siren configuration according to the present invention using a band or belt instead of a disk for incorporation into the light pattern image forming system.
Figure 6:
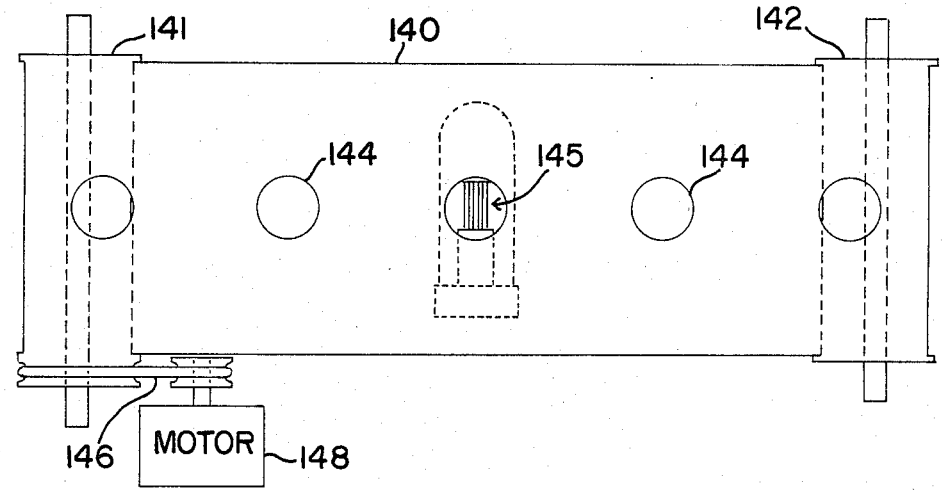

An alternative "optical siren" configuration for the light pattern image forming system for use in the embodiment of FIG. 2, for example, is shown in FIGS. 6 and 6A. According to this embodiment the optical siren effect is achieved using a belt or loop rather than a disk. The optical siren belt 140 is in the form of a band or belt or loop constrained to move around and driven by drum pulleys 141 and 142. The belt or band is formed with a row of holes or windows 144 extending fully around the belt. A continuous illumination lamp 145 is positioned inside the belt aligned with the holes 144. Drum pulley 141 is driven by a belt 146 mounted at one end to the drum pulley and to a variable speed motor 148. In the various embodiments of the present invention the optical siren belt configuration may be substituted for the optical siren disk to produce the same effect of pulses of light. Furthermore, the windows or holes 144 may be covered with different color light transmitting or light transparent materials for delivering multicolor pulses of light.

Alternatively, the optical siren perimeter 140 may be in the configuration of a drum or cylinder with continuous lamp 145 positioned inside the cylinder and adjacent to the perimeter. The cylinder or drum is mounted for rotation about a central axis at the center of the drum or cylinder.

According to another embodiment, the belt configuration may be used in place of the color wheel in FIGS. 1 and 5. Such a color belt is formed with bands of different color transparencies and passes adjacent a strobe light source positioned within the belt to generate multicolor pulses of light. The belt is mounted on rollers or pulleys as previously described with reference to FIGS. 6 and 6A. Furthermore, shutters or any mechanical means of repetitively interrupting a light source can be used as an equivalent to an optical siren.

Figure 7:
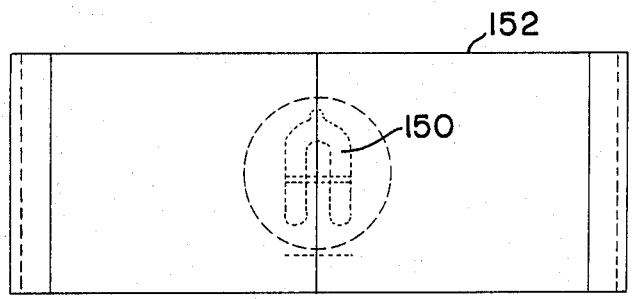
FIG. 7 is a diagrammatic side view of an alternative multicolor source configuration according to the present invention using a drum instead of a disk for incorporation into the light pattern image forming system.

A further alternative source of multicolor pulses of light is illustrated in FIG. 7. This embodiment of the invention may be substituted for the single strobe light and color wheel and as shown in the example of FIG. 7 comprises a single strobe light flash tube 150 mounted at the center of a color drum or cylinder 152. According to this example of the invention the color drum or cylinder 152 comprises a drum or cylinder of circular cross sectional configuration formed with vertical bands of different color light transmitting material. The color drum or cylinder is mounted for rotation about a central axis by means, for example, of a motor shaft and the single strobe light flash tube 150 is mounted inside the color cylinder or drum but adjacent the circumference or periphery for delivering different color pulses of light as the color drum rotates about its vertical axis of rotation. Thus, instead of a color wheel or disk, a color loop may be used whether in the form of a belt as previously described or in the form of a drum or cylinder as shown in FIG. 7. Similarly, the mask may be in the form of a drum or cylinder, but positioned concentrically around the light pulse source as described hereafter with reference to FIG. 11.

Figure 8:
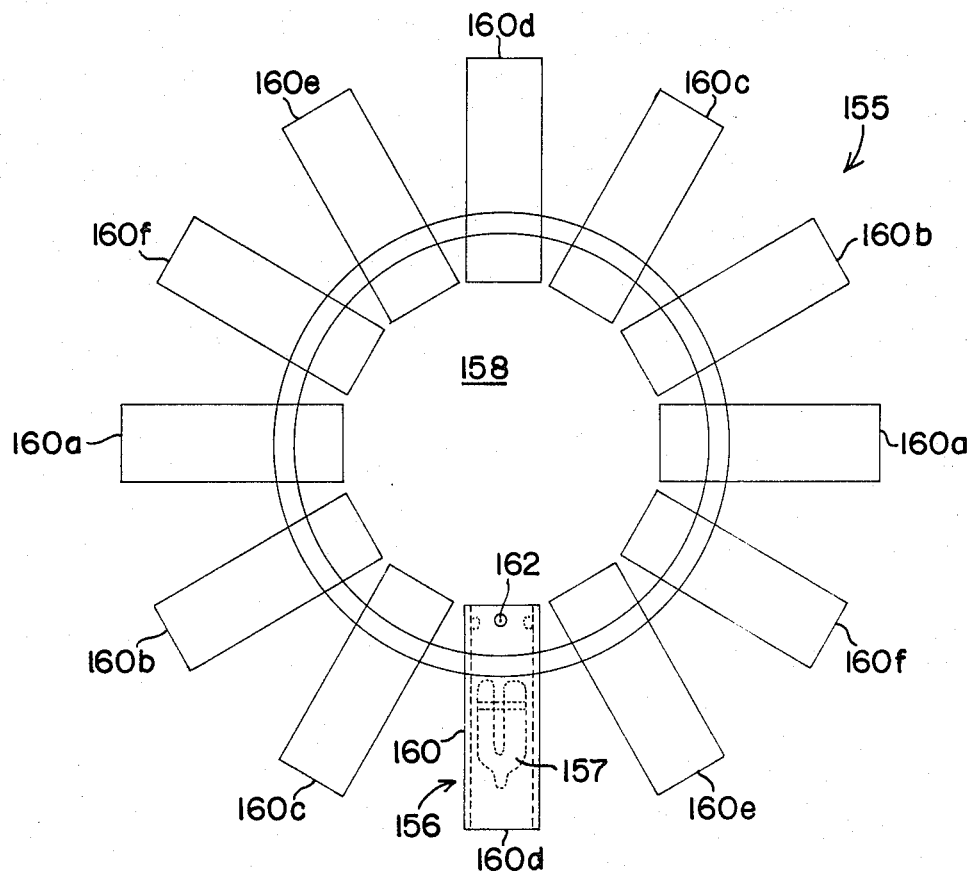
FIG. 8 is a diagrammatic plan view from the front of a stationary six color sequential strobe light source with 12 flash tubes and holders or envelope tubes arranged in a radial array for incorporation into the light pattern image forming system in place of the color wheel and single strobe light source.

A stationary source 155 of multicolor light pulses is illustrated in FIG. 8. In order to provide a stationary light source, a plurality of intermittent strobe light sources 156 are provided arranged in this example in a radial array around a central plenum 158. Each intermittent light source comprises a strobe light flash tube 157. Each glass envelope tube 160 as hereafter described is formed along its back side with a mirrored surface for concentrating the pulses of light in the direction of the optical path while the front surface of each of the glass envelope tubes 160 is covered with a color filter or different color light transmitting material so that the light pulses along the optical path are multicolored. This method has the additional advantage that the color sequence may be electronically programmed, or controlled by music or audio signals. In the example of FIG. 8, the glass tube envelopes 160a are formed with red filters such as red color gel over the forward surface in the direction of the optical path. Envelope tubes 160a deliver orange pulses; 160c; yellow pulses: 160d; green pulses; 160e, blue pulses; and 160f. violet pulses. By the expedient of using at least two flash tubes and envelope bulbs per color for uniform lighting by the multicolor pulses of light is achieved along the optical path. It is contemplated by the invention that the central plenum 158 communicates with an air pipe to an air blower for delivering cooling air through the array of flash tubes and color envelope tubes. The flash tube and flash tube envelopes are mounted around a ring or rim 161 with holes 162 formed in the glass tube envelopes for wire leads to the strobe light flash tubes. The flash tubes can be fired in any color sequence as determined by programmable logic circuitry.

Figure 9:
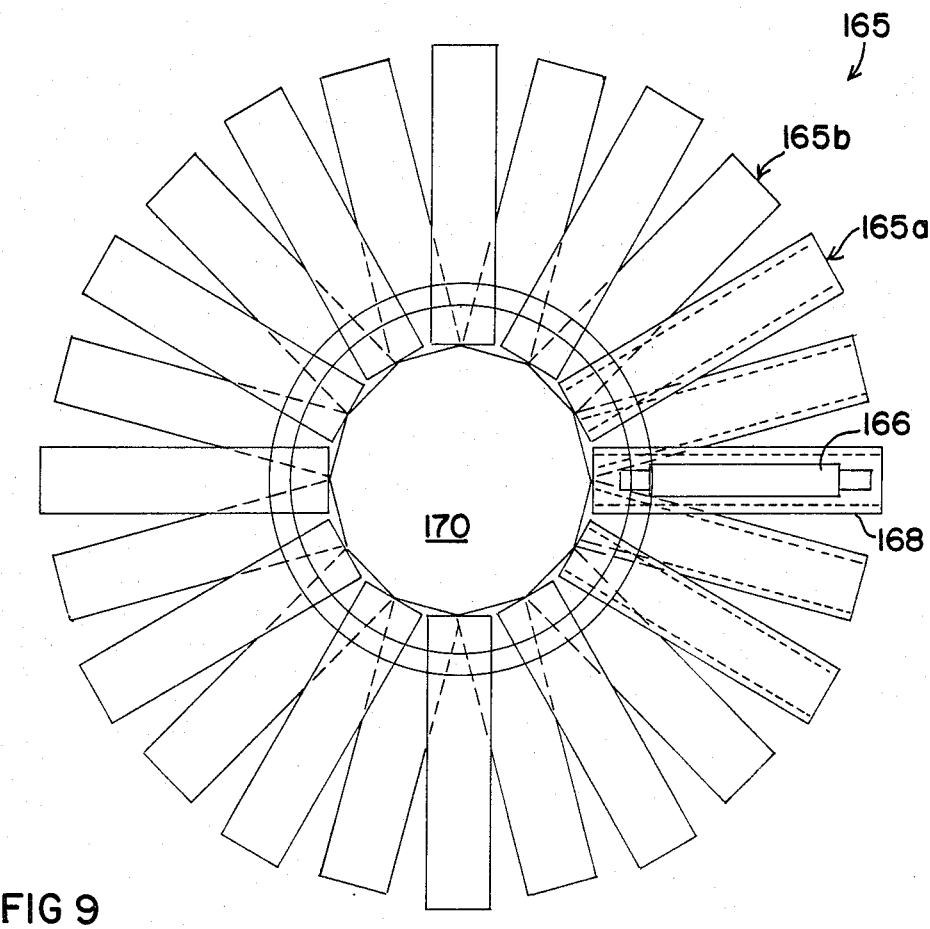
FIG. 9 is a diagrammatic plan view from the front of another multicolor strobe light source with 24 linear flash tubes mounted in flash tube holders or envelope tubes arranged in a composite radial array with two circles or arrays of 12 tubes, one behind the other and offset so that all tubes are visible along the optical path.
Figure 9A:
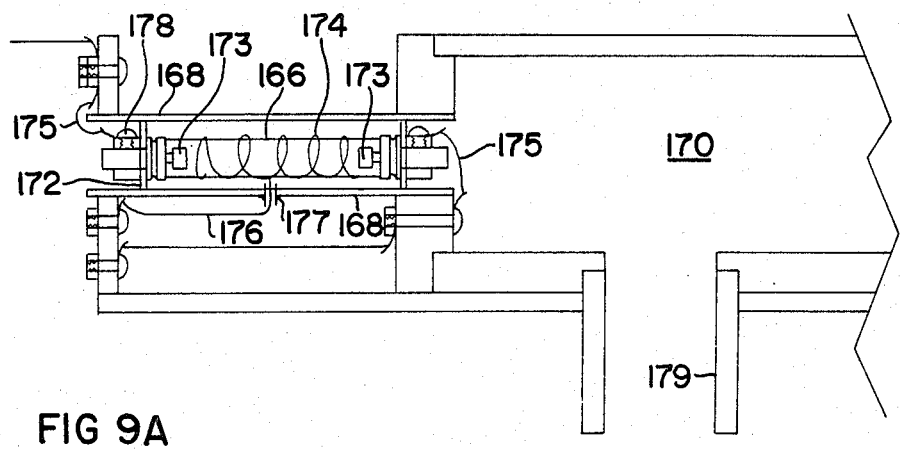
FIG. 9A is a side cross sectional view through a fragmentary portion of the radial array stationary six color strobe light source.

A more complex stationary source flash tube envelope tube array is illustrated in FIG. 9. The intermittent multicolor light pulse source 165 is a compound array with a first radial array 165a and a second radial array 165b positioned behind the first radial array and offset in a rotational direction so that all of the flash tubes and envelope tubes are visible along the optical path normal to the center of the radial array. Each radial element of a radial array is formed by a strobe light flash tube 166 mounted within an envelope mounting tube 168 of transparent material such as glass. The central plenum 170 communicates through an air pipe to a blower for delivering cooling air over the flash tubes and through envelope tubes. The detailed construction of the elements of the compound array are described with reference to FIGS. 9A and 9B. Each flash tube 166 is mounted within an envelope tube 168 by washers or spacers 172 which may be, for example, wire screen washers to permit passage of cooling air between the flash tube 166 and envelope tube 168. Each flash tube further comprises electrodes 173 and a trigger or tickler wire 174. The electrodes 173 are connected through leads 175 to the flash tube power supply and the tickler coil or trigger wire 174 has its own lead 176 passing through a hole 177 in the envelope tube 168. Appropriate insulators and spacers are used throughout the construction as required and illustrated in FIGS. 9A and 9B. The set screws or panhead screws 178 serve to secure the flash tube mounting and the electrical leads 175 to the electrodes 173.

Figure 9B:
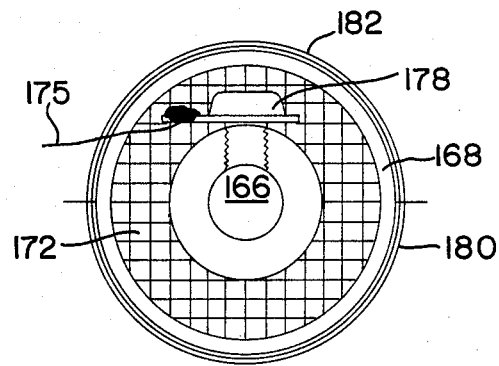
FIG. 9B is an end cross section through one of the flash tubes and glass envelope mounting in the array.

Referring particularly to FIG. 9B, the bottom half or rear half of the cylindrical envelope tube 168 is provided with a mirrored surface 180. The mirrored surface 180 may be formed directly on the glass surface of envelope tube 168 or, for example, on a mylar sheet secured to the envelope tube surface. In either event the mirrored surface serves to direct the light pulse energy in the direction of the optical path. The upper surface or forward surface of envelope tube 168 is covered with a color filter 182 for delivering pulses of light originating from flash tube 166 with a selected color along the optical path. In the compound array of FIG. 9, each color is represented by at least three or four envelope tubes distributed around the array for even lighting by multicolor light pulses along the optical path normal to the array as heretofore described. The use of multiple flash tubes and envelope tubes sufficient to represent all the selected colors thereby permits use of a stationary light source to achieve the multicolor light pulses. The stationary multicolor intermittent light pulse source of FIGS. 8 and 9 may therefore be substituted for the color wheel and single strobe light or for the optical siren described with reference to FIGS. 1 through 7.

Figure 10:
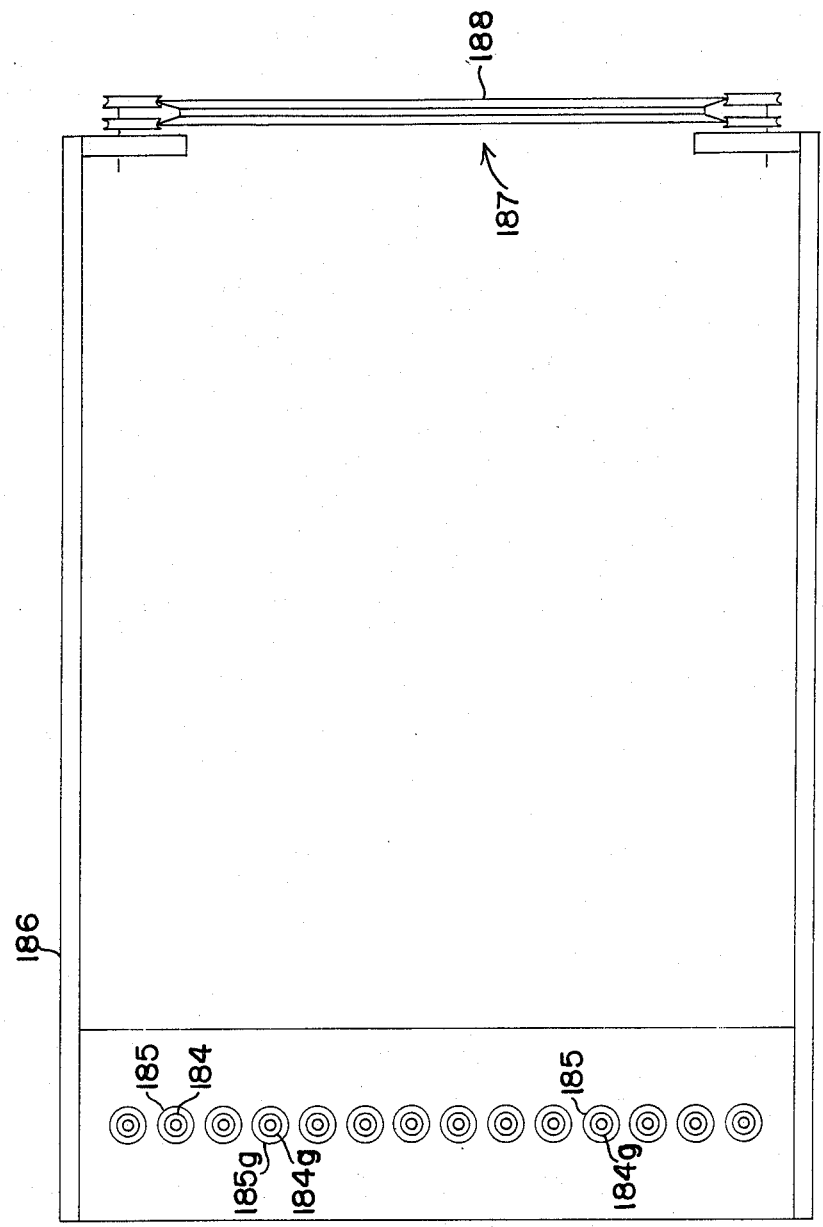
FIG. 10 is a diagrammatic side view of another stationary multicolor strobe light source with the flash tubes and flash tube holders or envelope tubes arranged in a parallel array.

Another stationary source of intermittent multicolor light pulses is shown in the light pattern image forming system embodiment of FIG. 10. According to this example, a plurality of flash tubes 184 mounted in envelope tubes 185 are arranged in a row in a parallel array with each selected color represented by at least two flash tubes and envelope tubes. For example, the color green is represented by flash tubes 184g and envelope tubes 185g. The flash tubes and mounting envelope tubes are constructed in a manner similar to that described with reference to FIG. 9B with a mirrored surface on the rear side or back side of the envelope tubes 185 and appropriate color filters are multicolor light transmitting materials along the front or forward surfaces of the envelope tubes 185 in the direction of the optical path.

The stationary multicolor light pulse source of FIG. 10 is housed at one end of housing 186 at the other end of which is mounted a rotating window 187 formed with a frosted surface 188 for viewing light pattern images. A mask not shown is mounted on the rotating window or screen and the inside of the housing box 186 is painted white or with a mirror reflective surface.

Figure 10A:
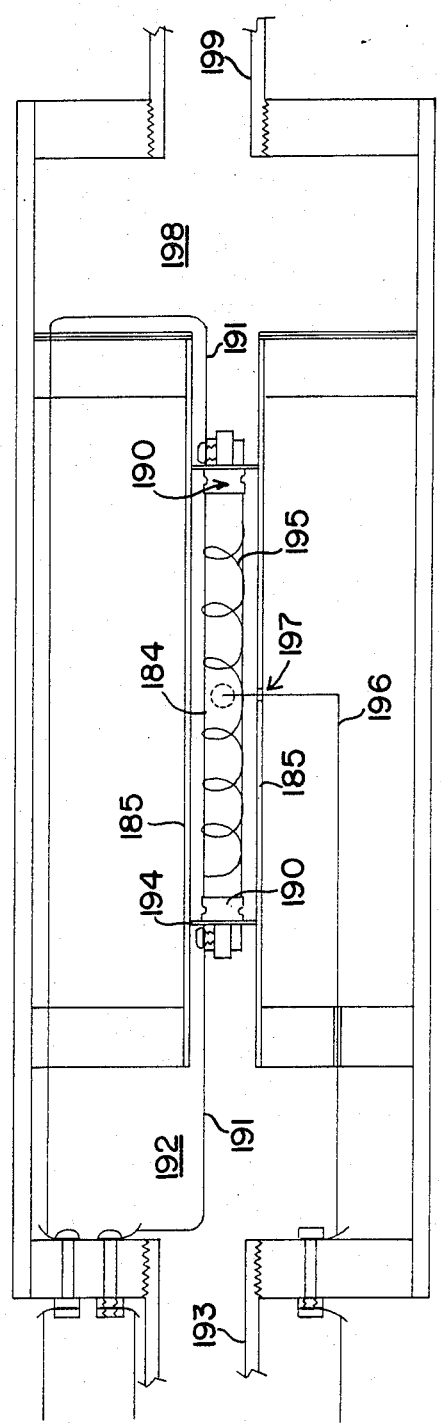
FIG. 10A is an end cross section through the parallel array showing one of the multicolor strobe light flash tubes.

As shown in FIG. 10A, the flash tube 184 mounted within the glass envelope tube 185 includes electrodes 190 served by leads 191.

In the parallel array configuration an air plenum 192 is provided along one end of the flash tubes through which cooling air is delivered via air pipe 193. Forced air may therefore pass over the flash tube between the flash tube and envelope tube through the mesh of wire screen spacer or washer 194 for cooling the flash tubes. As heretofore described the flash tube inlcudes a tickler coil 195 and lead 196 passing through a hole 197 in the envelope tube 185. All electrical leads pass through the housing using suitable connectors, lugs and insulators.

Cooling air received through air pipe 193 and into the plenum air space 192 passes over the flash tubes between the flash tubes 184 and envelopes 185 to the exiting air plenum 198 and exhaust air pipe 199.

Figure 11:
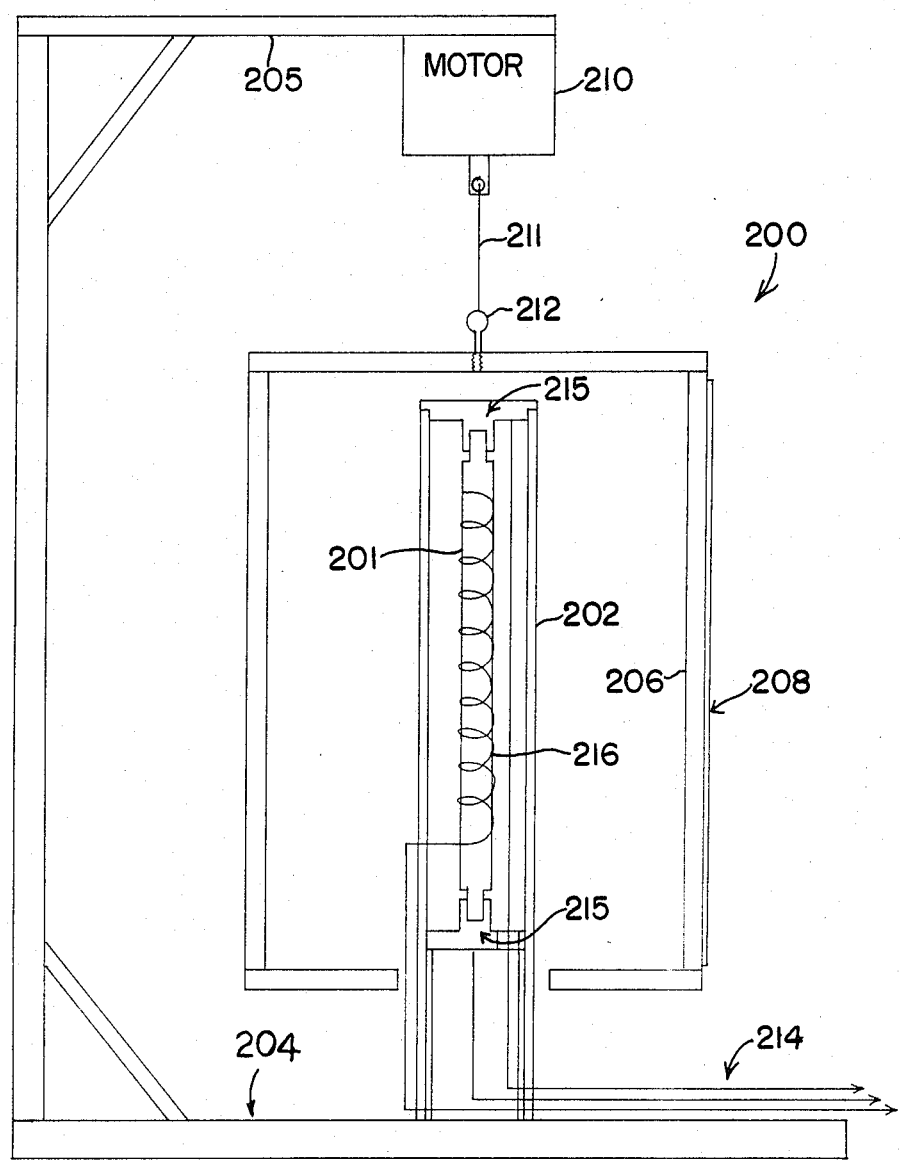
FIG. 11 is a diagrammatic side view in partial section of a rotating drum configuration light pattern image forming system according to the invention.

According to the example configuration of the invention shown in FIG. 11 the intermittent light pulse source in the form of a linear strobe light flash tube 201 is mounted at the central axis of the cylindrical device. Coaxially around the inner flash tube 201 and forming a mounting and housing for the flash tube is a clear or multicolor envelope tube 202 such as a glass envelope tube. The strobe light flash tube 201 and envelope tube 202 are mounted in stationary position in the example of FIG. 11 on a base 204. The base 204 is rigidly connected to an overhead support 205 from which is suspended coaxially and concentrically around the central axis flash tube 201 and envelope 202 a transparent or light transmitting mounting drum 206 around which is wrapped a mask 208 for passing light pattern images through the clear plastic mounting drum 206 from pulses of light originating at the strobe light flash tube 201. Bands of different color light transmitting material may be fitted around the envelope tube 202 in order to afford multicolor pulses of light passing through the rotating mask 208.

Furthermore, the envelope tube 202 may be mounted for rotation on the base 204 to introduce another variable parameter. Thus, the envelope tube may be independently mounted on bearings and driven by a belt and motor on base 204 to generate multicolor pulses of light in each direction. This provides a rotating color drum or cylinder 202 as described above with reference to FIG. 7.

The clear mask mounting drum 206 is suspended for rotation from the support arm 205 rigidly connected to the base 204 and is driven by a variable speed slow shaft gear motor 210 on a wire cable 211 coupled through a hook 212 at the top of the drum 206. The slow shaft rotation of variable speed motor 210 is communicated to the drum by the suspending wire or cable 211. The angular velocity of rotation of the mask mounting drum 206 and mounted mask 208 is adjusted by variation of speed of the motor 210 to achieve different effects in the light pattern images which pass through the mask to a stationary image presentation or display screen or camera not shown. In order to achieve multicolor effects from the pulses of light emitted by the strobe light flash tube 201, bands of different color light transmitting material may be applied to the surface of the envelope tube 202. Other details of the apparatus shown in FIG. 11 include the lead wires 214 from the stationary base and mounting of the strobe light flash tube coupled to the electrodes 215 and the tickler coil wire or trigger coil 216.

Figure 12:
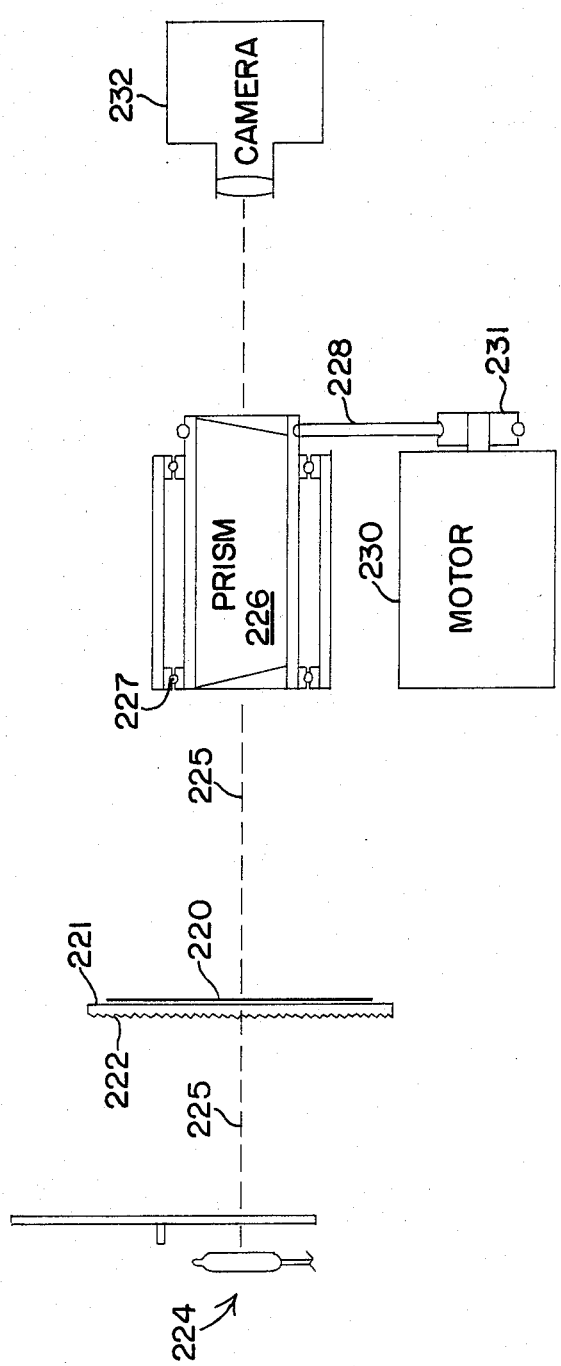
FIG. 12 is a diagrammatic side view in partial section of a light pattern image forming system using a rotating prism and stationary mask.

Another configuration of the present invention for producing motional effects in the light pattern images generated by the system is illustrated in FIG. 12. In this embodiment of the invention the mask 220 is mounted in stationary position on a stationary frosted window surface 221 formed along its opposite face with a fresnel lens 222 for collimating pulses of light received from strobe light flash tube 224. A color wheel of the type heretofore described may be also be provided adjacent to flash tube 224 in the optical path 225 for delivering multicolor pulses of light through the elements of the light pattern image forming system.

In order to achieve motional effects and in particular rotational effects of the mask pattern, rotation of the light pattern image according to the embodiment of FIG. 12 is achieved optically rather than by physical rotation of the mask 220. While mask 220 remains stationary patterns of light along the optical path 225 pass through a dove prism 226 mounted for rotation in circumferential bearings 227. Thus, the dove prism 226 is oriented with its elongate axis along the optical path 225 and rotates on the bearings 227 at its outer periphery. The dove prism is driven in rotation by a belt 228 in turn driven by variable speed motor 230 by way of pulley 231. By means of the rotating dove prism rotation of the light patterns formed by mask 220 are therefore cause to rotate optically around the optical path 225 while the mask 220 and its mounting window 221 remain stationary. The rotating image effects achieved by this alternate method are captured, for example, by camera 232 which may be a slide, movie, or video camera for recording or live viewing.

In other alternative configurations of the invention, rotational effects are achieved by, for example, rotation of the camera, or rotation of the strobe light unit. Thus, instead of a rotating dove prism or rotating mask, other components of the system may be rotated while the remaining elements are stationary. For example, with a stationary mask, a rotating camera or rotating image forming system housing can produce results similar to rotating the mask.

Figure 13:
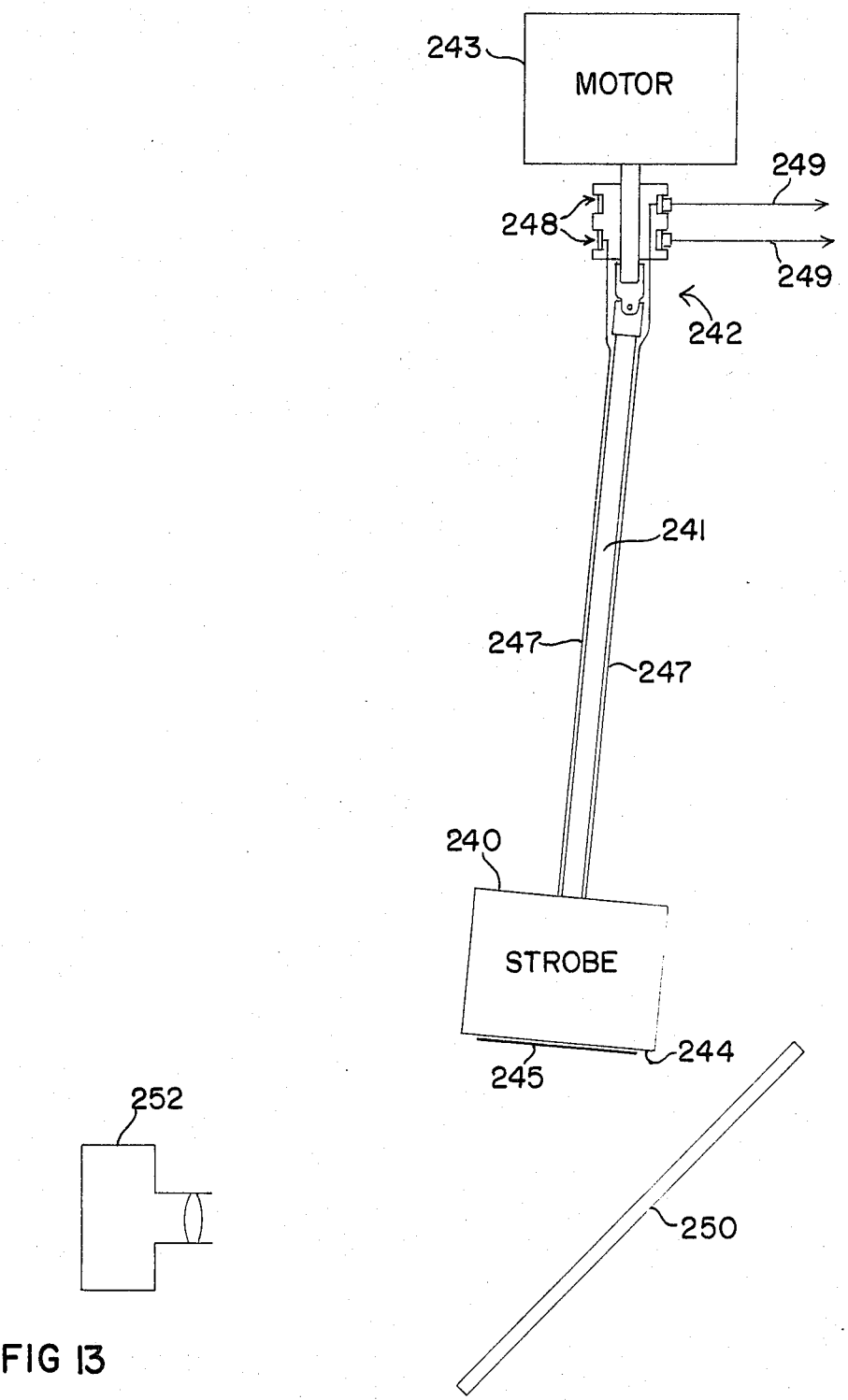
FIG. 13 is another light pattern image forming system according to the invention in which the strobe light source and mask are mounted for pendulum swinging motion to achieve greater pattern varieties.

A final example embodiment of the light pattern image forming system of the present invention is illustrated in FIG. 13 where yet another degree of freedom of motion is introduced in the form of translational motion instead of or in addition to rotational motion. Thus, according to the embodiment of FIG. 13 both translating and rotating image effects are achieved.

As shown in FIG. 13 a housing 240 containing elements of the light pattern image forming system as heretofore described is mounted at the end of a pendulum rod 241 in turn coupled through a universal joint 242 to a variable speed DC gear motor 243 of, for example, 0 to 500 RPM output for providing the motive force for swinging the housing 240 through a small arc at the end of pendulum rod 241.

Housing 240 is formed at its base or bottom surface with a generally horizontal mounting window 244 on which is mounted the mask 245 formed with the desired pattern or symmetry of opaque portions and slits or transmitting portions. The mounting window 244 may be, for example, a window turntable for also adding rotational effects in the light pattern images. Inside the upper portion of the housing 240 is mounted an intermittent light pulse source such as, for example, a strobe light flash tube. The leads 247 for delivering power to the strobe light flash tube pass from the housing 240 up along the pendulum rod 241 through a set of slip rings 248 which provide continuous sliding electrical contact with, for example, a 110 volt source through power lines 249.

Light pattern images generated by pulses of light passing through the selective mask 245 are subject to translational or transverse motion as the housing 240 swings back and forth through a small arc at the end of the pendulum rod 241. The resulting scanning pattern is diverted by an angled mirror or reflective surface 250 to an image presentation element for recording or displaying the light pattern images, such as, for example, camera 252 which may be, for example, a slide camera, movie camera, video camera, etc.

A number of variations of the present invention as heretofore described may be mounted in the housing 240. For example, a multicolor intermittent light pulse source may be used by installing a color wheel or optical color siren as heretofore described. The overall effect of the arrangement of FIG. 13, however, is to introduce translational motion effects into the light pattern images instead of or in addition to rotational image effects.

In an alternative configuration the housing 240 is inverted and mounted on a stationary base with the horizontal window 244 looking upward. The camera 252 is mounted on the pendulum 241 for translational motion back and forth over window 244 and mask 245. The swinging motion of the camera produces image effects similar to motion of the housing etc.

Figure 14:
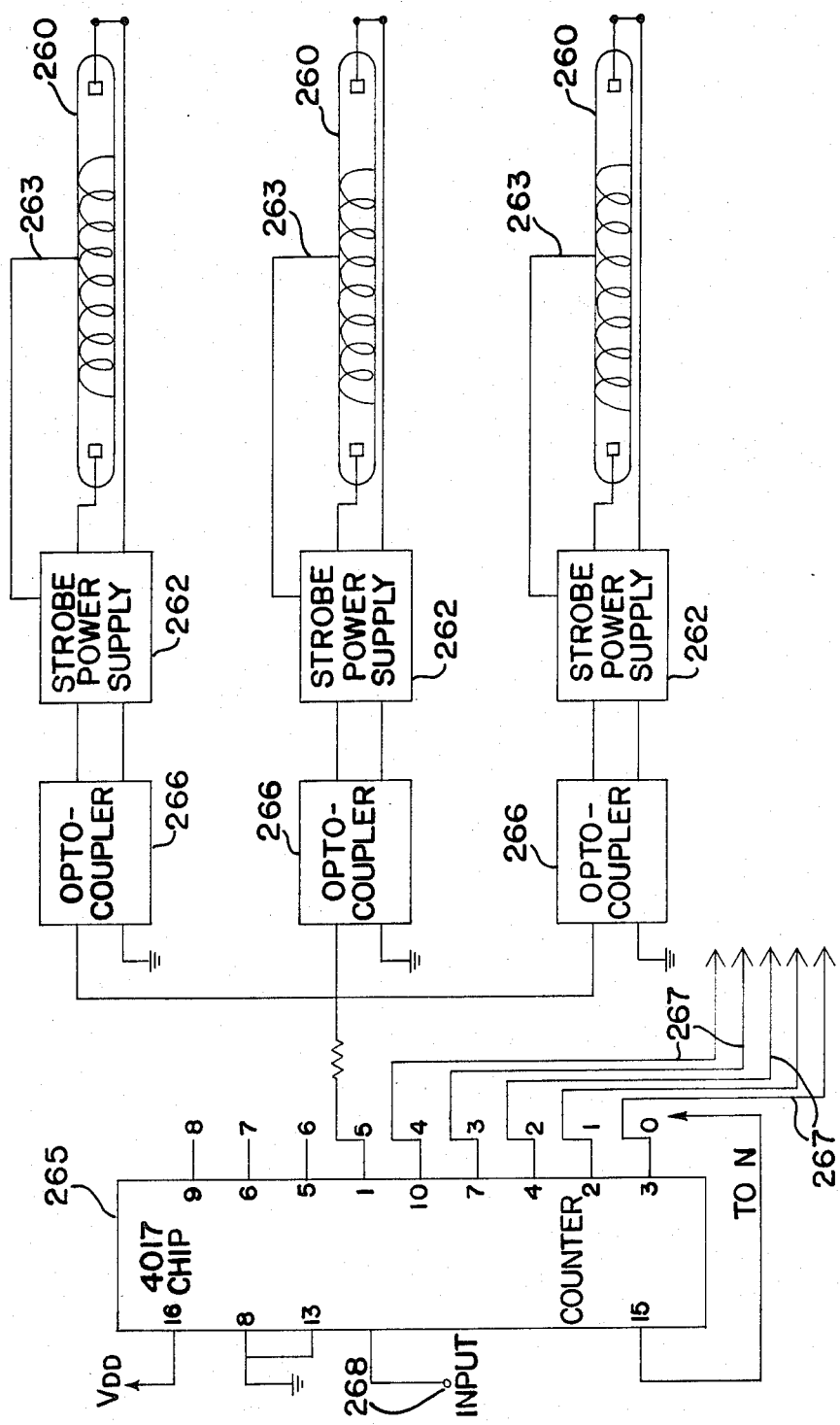
FIG. 14 is a fragmentary portion of a circuit diagram for sequence control over the power supplies for flash tubes in the multiple flash tube multicolor light source array of FIGS. 8 and 9.

One arrangement for control of the strobe light flash tubes in the multicolor light source flash tube array of FIGS. 8 and 9 is illustrated in FIG. 14. In this arrangement each flash tube 260 of a particular color is provided with its own strobe power supply 262. Each strobe power supply is of the conventional type with a step up transformer with a secohdary coupled through a full wave bridge rectifier, power resistor, and large capacity capacitor, such as an oil capacitor coupled to the anode and cathode of the flash tube. The tickler coil wire 263 is connected to a high voltage pulse trigger transformer in the strobe power supply 262 and when actuated by a sequential count from the end counter 265 permits the large capacitor to discharge between the anode and cathode and fire flash tube 260 all in the conventional manner. In this case, however, the count pulses from counter 265 are coupled to the strobe power supplies 262 through opto-couplers 266 shown in further detail in the circuit diagram of FIG. 15.

The counter 265 is a count to "n" and recycle circuit such as provided by the generically designated type 4017 IC chip. The circuit connection for the pins of the 4017 chip are shown in FIG. 14 with the conventional pin designations indicated by small numerals. The count pulse outputs along the right side of the chip may be connected to other flash tube color groups of the flash tube array through output leads 267. The counter 265 is in turn actuated at its input 268 by the clock signal from a pulse generator or an audio/music signal as hereafter described.

Instead of providing a separate strobe power supply for each strobe light flash tube, a single strobe power supply can be connected to, for example, three flash tubes of the same color connected in series. In this manner, the cost of the number of power supplies and the weight of transformers, for example, can be reduced. In such a series method, three flash tubes of the same color are connected in series with a single strobe power supply. The strobe power supply is in turn connected to the counter actuator through an opto-coupler in the manner shown in FIG. 14.

Figure 15:
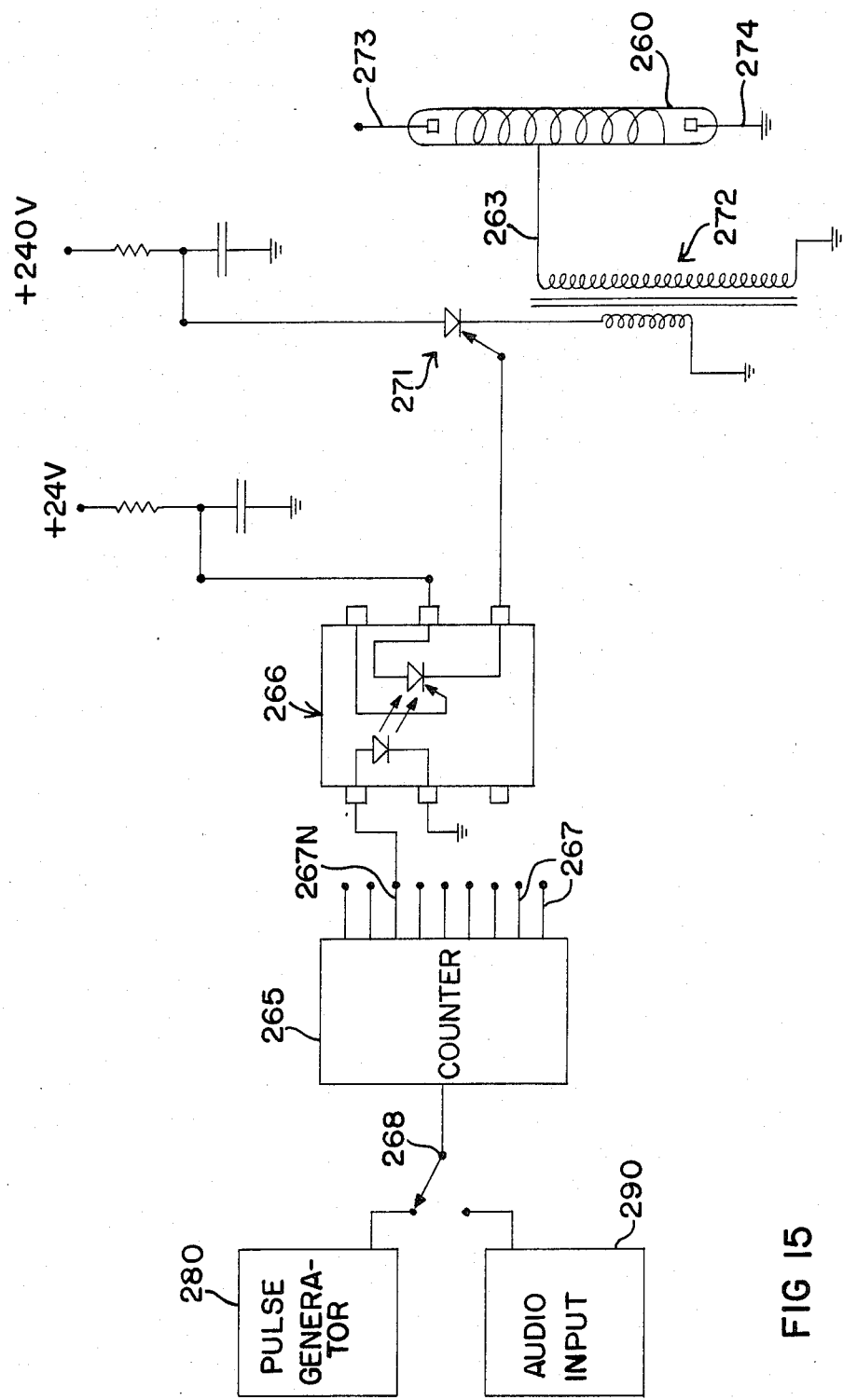
FIG. 15 is a detailed schematic diagram of a fragmentary portion of the circuit diagram of FIG. 14 showing the "opto-coupler" and trigger circuit for controlling the tickler coil to a particular strobe light flash tube.

A more detailed circuit diagram of the triggering portion of the power supply control circuit is illustrated in FIG. 15. As shown in FIG. 15, the count to "n" and recycle counter circuit 265 is triggered at its input 268 by either a pulse generator 280 which delivers sequential clock pulses or an audio input circuit 290 for controlling the flash tubes in response to an audio signal such as music as hereafter described. The "n" sequential outputs 267 of counter 265 are coupled in sequence to "n" power supplies through "n" opto-couplers 266 only one of which is shown coupled through the counter output line 267n.

The opto-coupler 266 is an SCR output opto-coupler, for example a Radio Shack SCS 11C3 in which a light emitting diode actuated by an output pulse from counter 265 in turn actuates a photo sensitive SCR gate. The ouput from opto-coupler 266 triggers the high voltage SCR 271 which passes a pulse through high voltage pulse transformer 272. The secondary of high voltage pulse transformer 272 provides the high voltage pulse through tickler coil wire 263 to the tickler coil of flash tube 260. This in turn permits discharge of the large capacity discharge capacitor in the main power supply between the anode 273 and cathode 274 of flash tube 260.

Figure 15A:
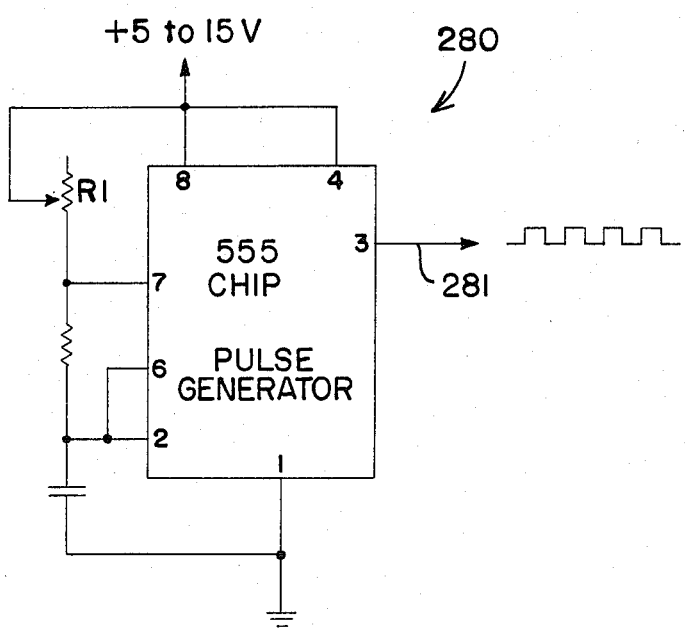
FIG. 15A is a circuit diagram of a typical pulse generator circuit to provide signals to the counter circuit of FIG. 15.

A typical pulse generator 280 for use in the flash tube trigger circuit of FIG. 15 is illustrated in FIG. 15A. Trigger circuit 280 provides signals to the counter circuit 265 for sequential actuation of the different flash tube color groups in the strobe light flash tube array. The pulse generator circuit 280 of FIG. 15A is based upon a generic designation 555 IC chip. The pin terminal connections are shown in FIG. 15A with the conventional pin number designations in small numerals. The circuit includes a variable resistor R1 and includes at the output 281 at pin terminal 3 a square wave pulse sequence of clock signals for the counter circuit 265.

Figure 15B:
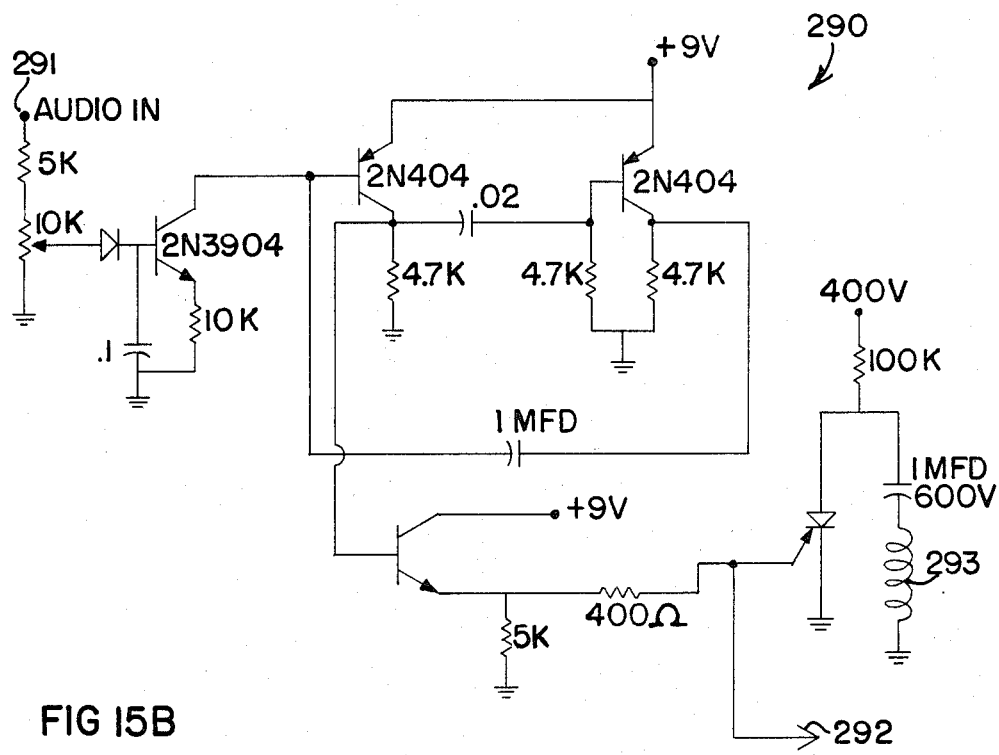
FIG. 15B is a circuit diagram of one example of an analog music/audio input to flash rate control output for the trigger circuit of FIG. 15.

An alternative control for actuating counter circuit 265 by means of music or other audio signals audio input circuit 290 illustrated in FIG. 15B. Music or other audio input signal is connected to input terminal 291 and the output at 292 can be fed into the counter circuit 265 for actuating the multiple flash tube color groups at a rate responsive to the music or other audio signal. Alternatively, transformer primary 293 functions as the primary in the high voltage pulse trigger transformer which actuates the tickler coil wire coupled to the secondary of the transformer 293 not shown. The remaining elements of the analog music or audio signal to flash rate control circuit shown in FIG. 15B are designated by their conventional values and component numbers as apparent to those skilled in the art.

Another simple analog circuit for control of the strobe light flash tube flash rate control may be devised using a so called "color organ" which converts the audio input into a light control signal for controlling an illuminating lamp. A photo resistor in juxtaposition with the variable light illuminating source controlled by the color organ is substituted for the variable resistor R1 in the pulse generator circuit of FIG. 15A. In this manner the pulse signal at output 281 varies in response to the variable illumination which in turn varies with the music or other audio input to the color organ.

Instead of an analog control, a digital strobe light flash tube pulse rate control may be provided by connecting the music or other audio input sound to a wave shaper utilizing, for example, a generic designation 7474 IC chip. The wave shaper eliminates undesired harmonics and delivers a single square wave pulse signal. This square wave pulse signal is input to a frequency divider circuit which divides the square wave pulse signal to a lower harmonic of the desired frequency and scale. This signal is in turn used to actuate and sequence the counter circuit 265 in response to the variations in the music or other audio sound input.

While the invention has been described with reference to particular example embodiments, it will be appreciated that it is intended to cover all variations and equivalents within the scope of the following claims.

I claim:

1. A light pattern image forming system comprising: intermittent light source means constructed and arranged for generating pulses of light over an optical path;

color wheel means mounted for rotation about a first center of rotation, said color wheel means comprising sectors of different color light transmitting material, said color wheel means positioned with said first center of rotation offset from the optical path of the intermittent light source means so that the sectors of different color light transmitting material pass adjacent to the intermittent light source means in the optical path for generating multicolor pulses of light over said optical path;

means for rotating said color wheel means for successively positioning the sectors of different color light transmitting material in the optical path adjacent to the intermittent light source means;

mask means mounted for rotation about a second center of rotation offset from the first center of rotation of the color wheel means so that the second center of rotation falls along the optical path of the multicolor light pulses, said mask means comprising a pattern of openings or transparent portions formed in opaque masking material with a symmetry relative to the second center of rotation, said second center of rotation of the mask means offset from the first center of rotation of the color wheel means so that the intermittent light source means, sectors of light transmitting color material and said second center of rotation of the mask means define said optical path;

means for rotating said mask means around the second center of rotation at selected variable speeds;

and image presentation means aligned in the optical path for recording and/or displaying the multicolor light pattern images formed by the system.

2. The image forming system of claim 1 wherein said intermittent light source means comprises at least one strobe light flash tube.

3. The image forming system of claim 1 wherein the image presentation means comprises camera means mounted in the optical path.

4. The image forming system of claim 1 wherein the mask means comprises transparent mounting plate means mounted on bearings at its circumference for rotation about the second center of rotation so that the second center of rotation and optical path are free of any center of rotation obstruction of the optical path, and at least one opaque mask having the pattern of slit openings or transparent portions formed therein for transmission of pulses of light in predetermined patterns, said mounting plate means constructed and arranged for mounting of the mask with the second center of rotation in the optical path.

5. The image forming system of claim 4 in which the mask means comprises an opaque sheet having a pattern of transparent portions or slots formed therein with radial symmetry about the second center of rotation.

6. The image forming system of claim 4 in which the mask means comprises an opaque surface with at least one spiral slot opening or transparency formed therein having a center of symmetry at the second center of rotation.

7. The image forming system of claim 1 wherein said color wheel means comprises around its outer periphery air turbine blades, and further comprising air passageway means constructed and arranged for delivering air under pressure to said turbine blades for rotating the color wheel.

8. The image forming system of claim 7 wherein the mask means comprises around its outer periphery air turbine blades, and further comprising second air passageway means constructed and arranged for delivering air under pressure to said turbine blades for rotating the mask means.

9. The image forming system of claim 8 wherein the intermittent light source means comprises at least one strobe light flash tube.

10. The image forming system of claim 1 wherein the mask means comprises a transparent mounting wheel and at least one mask of opaque material with a pattern of openings formed therein and wherein a fresnel condenser lens is formed across one surface of the transparent mounting wheel.

11. The image forming system of claim 10 wherein the transparent mounting wheel means comprises a frosted window front surface for viewing the light image pattern.

12. The image forming system of claim 1 wherein the mask means is mounted for rotation by ball bearing race means at the circumference of the mask means so that the second center of rotation and optical path are free of any center of rotation obstruction of the optical path.

13. The image forming system of claim 12 wherein the means for rotating the mask means comprises belt drive means constructed and arranged for driving the mask means around the outer circumference of said mask means.

14. A light pattern image forming system comprising:
an intermittent light source comprising continuous light source means and an optical siren disk means mounted for rotation about a center of rotation offset from the light source means, said siren disk means comprising an opaque disk with a plurality of openings formed there through concentrically around the first center of rotation said openings aligned with the light source means during rotation of the siren disk means thereby generating and passing intermittent pulses of light along an optical path by rotation of the siren disk means;
means for rotating the siren disk means at selected variable speeds for changing the frequency of the intermittent pulses of light;
mask means mounted for rotation about a second center of rotation offset from said first center of rotation and aligned so that the light source means, aligned openings in the optical siren disk for generating the pulses of light, and the second center of rotation of the mask means define said optical path, said mask means comprising an opaque portion and a transmitting pattern portion arranged with a symmetry with reference to the second center of rotation;
means for rotating the mask means at selected variable speeds;
and image presentation means aligned in the optical path of the light source means, optical siren disk openings, and mask means for recording and/or presenting the light image pattern formed by the system.

15. The light image forming system of claim 14 wherein the openings arranged concentrically around the first center of rotation through the siren disk means are covered with light transmitting materials of different colors for generating multicolor light pulses along an optical path.

16. The image forming system of claim 14 wherein the light source means comprises a continuous illuminating lamp means.

17. The image forming system of claim 14 wherein the light source means comprises a fresnel lens spaced from the siren disk means and arranged for focusing ambient light through the openings of the concentric ring of openings formed through the siren disk means as the siren disk means rotates.

18. The image forming system of claim 14 wherein the mask means comprises around its periphery an air turbine, and further comprising first air passageway means constructed and arranged for delivering air under pressure to drive said air turbine for rotation of the mask means.

19. The image forming system of claim 18 wherein the mask means comprises a collimating fresnel lens formed across the surface of the mask means.

20. The image forming system of claim 18 wherein said optical siren disk means comprises around its outer periphery an air turbine and further comprising second air passageway means constructed and arranged for delivering air under pressure for driving said turbine thereby rotating the optical siren disk means.

21. The image forming system of claim 20 wherein said first and second air passageway means comprise flexible tubes for blowing air into the respective air turbines of the mask means and optical siren disk means.

22. The image forming system of claim 21 wherein said first and second air passageways comprising flexible tubes intersect at a single flexible third tube for blowing on the respective air turbines of the mask means and optical siren disk means simultaneously.

23. The image forming system of claim 14 wherein the mask means is mounted for rotation on ball bearing race means at the perimeter of the mask means so that the second center of rotation and optical path are free of any center of rotation obstruction of the optical path.

24. The image forming system as set forth in claim 23 wherein the means for rotating the mask means comprises belt drive means constructed and arranged for driving the mask means at the outer periphery thereof.

25. The image forming system of claim 14 wherein the mask means is mounted for rotation at its periphery by at least 3 rollers, said mask means formed with at least one groove around the outer periphery thereof, said plurality of rollers constructed and arranged to engage the outer periphery of the mask means in said groove;
said means for rotating the mask means comprises belt drive means constructed and arranged around the outer periphery of the mask means so that the second center of rotation is free of any center of rotation obstruction of the optical path.

26. A light pattern image forming system comprising:
an intermittent light source comprising continuous light source means and an optical siren belt means mounted for translation and passage of the belt means adjacent to the continuous light source means, said siren belt means comprising an opaque belt portion having a row of transparent or transmitting openings formed therethrough and aligned with the light source means during translation of the siren belt means thereby generating and passing intermittent pulses of light along an optical path by translation of the siren belt means;

means for translating the siren belt means;

mask means mounted for rotation about a center of rotation aligned in the optical path of the light source means and openings formed through the optical siren belt means, said continuous light source means, aligned openings in the optical siren belt means and said mask means center of rotation defining an optical path for the pulses of light, said mask means comprising an opaque portion and a transmitting pattern portion arranged with reference to said mask means center of rotation;

means for rotating the mask means;

an image presentation means aligned in the optical path defined by the continuous light source means, optical siren belt means openings, and mask means, for recording and/or presenting the light image patterns formed by the system.

27. The light pattern image forming system of claim 26 wherein the openings formed through the optical siren belt means are covered with light transmitting materials of different colors for generating multicolor light pulses along an optical path.

28. The image forming system of claim 26 wherein said optical siren belt means comprises a flexible belt mounted on first and second drum pulleys for translation of the flexible belt around said drum pulleys upon rotation of at least one of said drum pulleys, and wherein said continuous light source means is mounted within the belt means between the sides of the belt means for delivering pulses of light through one side of the belt means as the row of holes formed through the belt means translates adjacent to the continuous light source means.

29. The image forming system of claim 26 wherein said optical siren belt means is formed in the configuration of a cylindrical drum belt mounted for rotation about a center of rotation at the center of said cylinder and wherein said continuous light source means is mounted within the cylinder adjacent to the periphery thereof for delivering pulses of light through the row of openings formed through the belt as the cylindrical belt rotates about its central axis.

30. A light pattern image forming system comprising:

intermittent light source means for generating pulses of multicolor light over an optical path, said intermittent light source means comprising at least one strobe light flash tube means and annular color loop means mounted for rotation around the strobe light flash tube means, said annular color loop means comprising an annulus loop element formed with bands of different color light transmitting material arranged around the loop element for generating and transmitting pulses of multicolor light over an optical path as different color light transmitting bands pass adjacent to the strobe light flash tube means, said strobe light flash tube means arranged adjacent to the wall of said color loop means;

means for rotating said annular color loop means for successively positioning the bands of different color light transmitting material adjacent to the intermittent light source means;

mask means mounted for rotation about a center of rotation spaced from the intermittent light source means and at right angles to the axis of rotation of said annular color loop means, said mask means center of rotation falling along the optical path of multicolor light pulses, said mask means comprising opaque masking material formed with a pattern of light transmitting openings or transparent portion having a symmetry with reference to the center of rotation;

means for rotating said mask means at selected variable speeds;

and image presentation means aligned in the optical path for recording and/or displaying the multicolor light pattern images formed by the system.

31. A light pattern image forming system comprising:

intermittent multicolor light source means for generating pulses of multicolor light over an optical path, said intermittent multicolor light source means comprising a plurality of flash tube means arranged in an array, said flash tube means constructed for delivering pulses of light of different color, at least two flash tube means provided for each color distributed over the array for more even pulse lighting over an optical path, said array of flash tube means mounted in stationary position in the image forming system;

mask means spaced from the intermittent multicolor light source means along an optical path, said mask means mounted for rotation about a center of rotation so that the mask means center of rotation falls along an optical path of the multicolor light pulses, said mask means comprising a transmitting pattern formed in opaque masking material with a symmetry relative to the center of rotation, for transmission of multicolor light pulses through the pattern in different rotational positions;

means for rotating said mask means around said center of rotation at selected variable speeds;

and image presentation means aligned in the optical path for recording and/or displaying multicolor light patterns images formed by the system.

32. The light pattern image forming system of claim 31 wherein the intermittent multicolor light source comprises:

a plurality of strobe light flash tube means arranged in an array, each said flash tube means mounted in a cylindrical envelope tube, each said envelope tube formed with reflective surface means along one side thereof and formed along the other side of the cylindrical envelope tube in the direction of the optical path with a light transmitting color filter material, said plurality of cylindrical envelope tubes formed with light transmitting color filter materials of different color for generating multicolor pulses of light in the direction of the optical path, said array of strobe light flash tubes and cylindrical envelope tubes comprising at least two cylindrical envelope tubes per color distributed through the array to afford more even lighting by different color pulses of light generated by said intermittent light source means.

33. The system of claim 32 wherein said array of strobe light flash tubes and cylindrical envelope tubes comprises a radial array with at least two flash tubes and cylindrical envelope tubes per selected color and wherein said radial array is constructed and arranged to afford an air passageway at the center of the array for delivering cooling air adjacent the flash tubes and cylindrical envelope tubes.

34. The system of claim 33 wherein said array of strobe light flash tubes and cylindrical envelope tubes comprises first and second radial arrays, said second radial array offset behind the first radial arrays, said second radial array offset behind the first radial array for visibility of all of the flash tubes and cylindrical envelope tubes of the composite array in the direction of the optical path.

35. The system of claim 32 wherein each said strobe light flash tube is mounted in a corresponding cylindrical envelope tube spaced from the cylindrical envelope tube by wire screen spacer means to permit the passage of cooling air between the flash tube and envelope tube.

36. The system of claim 32 wherein the strobe light flash tube and cylindrical envelope tubes are arranged in a parallel array.

37. The image forming system of claim 31 wherein the array of flash tube means comprises a radial array having at least two flash tube means per selected color.

38. The image forming system of claim 31 wherein said array of flash tube means comprises first and second radial arrays of flash tube means positioned one behind the other, the radially oriented flash tube means of the second array offset from the first array.

39. The image forming system of claim 38 wherein said array comprises at least three flash tube means per selected color distributed around the arrays.

40. The image forming system of claim 31 wherein each said flash tube means comprises an elongate glass tube outer envelope, a flash tube mounted within said glass tube envelope, electrical lead means passing through said outer glass tube envelope, and air space passageway means between said flash tube and outer glass tube envelope for passage of cooling air.

41. The image forming system of claim 40 wherein said means for mounting the flash tube within the outer glass tube envelope comprises wire screen means in annular configuration.

42. The image forming system of claim 31 wherein said array of flash tube means comprises a parallel array of parallel oriented flash tube means arranged in a row.

43. The image forming system of claim 40 further comprising inlet and outlet air plenum means for delivering cooling air over said flash tube means.

44. A light pattern image forming system comprising:
intermittent light source means comprising an elongate strobe light flash tube forming the central axis of the light pattern image forming system and the origin of radially directed light paths from the elongate strobe light flash tube:
a cylindrical envelope tube of light transmitting material formed coaxially around the central flash tube;
a light transmitting mask mounting drum suspended coaxially around the central flash tube and envelope tube, said mask mounting drum having larger diameter than the envelope tube and side walls space from the envelope tube;
support means for suspending the mask mounting drum over and coaxially around the envelope tube, said support means comprising variable speed motor means and means for suspending the mask mounting drum from the motor means whereby said mask mounting means may be rotated by the variable speed motor for translating the sidewall of the mask mounting drum around the envelope tube and central intermittent light source means;
and mask means for wrapping around and mounting on the side wall of the mask mounting drum, said mask means comprising an opaque material having a transmitting pattern portion arranged along the mask means for mounting around the drum whereby different light pattern images are projected by the light pattern image forming system along radial directions from the central strobe light flash tube during rotation of the mask mounting drum and mask means.

45. A light pattern image forming system of claim 44 wherein the light transmitting envelope formed coaxially around the central strobe light flash tube is formed with different color light transmitting bands of material for delivering multicolor light pulses radially outwardly from the strobe light flash tube source.

46. The light pattern image forming system of claim 45 wherein the light transmitting envelope tube is mounted for rotation about the elongate strobe light flash tube.

47. A light pattern image forming system comprising:
pendulum means and means for swinging said pendulum means through a small arc:
housing means coupled to the end of said pendulum means, said housing means containing intermittent light source means and mask means positioned within said housing means to define an optical path for projecting light pattern images through the bottom of said housing means:
reflector means positioned below the housing means and stationary relative to the swinging of the pendulum means for diverting the optical path:
and image presentation means positioned in said diverted optical path at a position stationary relative to the swinging of said pendulum means for recording or presenting said light pattern images.

48. The image forming system of claim 47 wherein is further provided in the optical path within said housing means, color wheel means and means for rotating said color wheel means whereby said projected light pattern images are multicolored.

49. A light pattern image forming system comprising:
intermittent light source means for generating pulses of light over an optical path;
mask means spaced from the intermittent light source means in the optical path and mounted relative to the light source means in stationary position;
dove prism means mounted in the optical path for rotation about a center of rotation along the optical path thereby affording a rotating image effect even with the mask means maintained in stationary positions;
means for rotating said dove prism means;
and image presentation means aligned in the optical path for recording and/or displaying the multicolor light pattern images formed by the system.

* * * * *